US012770153B2

(12) United States Patent
Wang et al.

(10) Patent No.: US 12,770,153 B2
(45) Date of Patent: Oct. 20, 2026

(54) PAYMENT METHOD, USER TERMINAL, APPARATUS DEVICE, SYSTEM,AND MEDIUM

(71) Applicant: CHINA UNIONPAY CO., LTD., Shanghai (CN)

(72) Inventors: Yu Wang, Shanghai (CN); Zhuo Chen, Shanghai (CN); He Huang, Shanghai (CN); Zhimin Xie, Shanghai (CN); Xinyuan Xu, Shanghai (CN); Zhangyuan Ye, Shanghai (CN); Yongsheng Huang, Shanghai (CN); Jien Zhou, Shanghai (CN); Wei Li, Shanghai (CN); Xi Shen, Shanghai (CN); Zhixiong Tang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/849,532

(22) PCT Filed: Aug. 29, 2022

(86) PCT No.: PCT/CN2022/115584
§ 371 (c)(1),
(2) Date: Sep. 23, 2024

(87) PCT Pub. No.: WO2023/178924
PCT Pub. Date: Sep. 28, 2023

(65) Prior Publication Data

US 2025/0217813 A1 Jul. 3, 2025

(30) Foreign Application Priority Data

Mar. 24, 2022 (CN) ......................... 202210294467.6

(51) Int. Cl.
*G06Q 20/42* (2012.01)
*G06Q 20/32* (2012.01)

(52) U.S. Cl.
CPC ........... *G06Q 20/42* (2013.01); *G06Q 20/325* (2013.01)

(58) Field of Classification Search
CPC ............................. G06Q 20/42; G06Q 20/325
(Continued)

(56) References Cited

U.S. PATENT DOCUMENTS

2015/0186864 A1* 7/2015 Jones ................. G06Q 20/3278 705/39
2015/0332262 A1* 11/2015 Lingappa ........... G06Q 20/3823 705/71
(Continued)

FOREIGN PATENT DOCUMENTS

CA 3118668 A1 * 3/2020 ........... G06Q 20/401
CN 109960447 A 7/2019
(Continued)

OTHER PUBLICATIONS

"Muchsin Hisyam, Integration Model of Multiple Payment Gateways for Online Split Payment Scenario, 2022" (Year: 2022).*
(Continued)

*Primary Examiner* — Sarah M Monfeldt
*Assistant Examiner* — Gregory M James
(74) *Attorney, Agent, or Firm* — ANOVA LAW GROUP, PLLC

(57) ABSTRACT

A method for data processing include: when payment is triggered by an e-commerce application program, calling a first SDK to obtain a first host program list from a network-wide payment platform, where the first host program list includes host program identifiers of at least part of host programs supported by the network-wide payment platform;
(Continued)

when a target host program is determined from the first host program list by calling the first SDK, calling the target host program; and calling, by means of the target host program, a second SDK to interact with the network-wide payment platform, so that the network-wide payment platform interacts with the host program platform to complete payment by a target card, the target card being a resource card bound to the target host program.

8 Claims, 14 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 2017/0221041 | A1 | 8/2017 | Brown | |
| 2020/0202321 | A1* | 6/2020 | Nitsch | G06Q 20/40 |
| 2020/0258061 | A1* | 8/2020 | Beadles | G06Q 20/102 |
| 2020/0349599 | A1* | 11/2020 | Marianne | G06Q 30/0623 |
| 2023/0043318 | A1* | 2/2023 | Selman | G06F 21/6209 |

FOREIGN PATENT DOCUMENTS

| | | | |
|---|---|---|---|
| CN | 112860457 | A | 5/2021 |
| CN | 112966196 | A | 6/2021 |
| CN | 113222570 | A | 8/2021 |
| CN | 113656087 | A | 11/2021 |
| CN | 114116036 | A | 3/2022 |
| CN | 114707976 | A | 7/2022 |
| JP | 2012094179 | A | 5/2012 |
| JP | 2020057392 | A | 4/2020 |
| JP | 2021111106 | A | 8/2021 |
| WO | 2021088671 | A1 | 5/2021 |
| WO | 2021143371 | A1 | 7/2021 |

OTHER PUBLICATIONS

The World Intellectual Property Organization (WIPO) International Search Report for PCT/CN2022/115584 Dec. 19, 2022 6 Pages (including translation).

* cited by examiner

PAYMENT METHOD, USER TERMINAL, APPARATUS DEVICE, SYSTEM,AND MEDIUM

CROSS-REFERENCE TO RELATED APPLICATION

This application is a national phase entry under 35 U.S.C. § 371 of International Application No. PCT/CN2022/115584, filed on Aug. 29, 2022, which claims priority to Chinese patent application 202210294467.6, entitled "PAYMENT METHOD, USER TERMINAL, APPARATUS, DEVICE, SYSTEM, AND MEDIUM," filed on Mar. 24, 2022. The entire content of all of which is incorporated herein by reference.

FIELD OF THE DISCLOSURE

The present disclosure generally relates to the data processing technology and, more particularly, relates to a payment method, user terminal, apparatus, device, system and medium.

BACKGROUND

With the development of payment technology, more and more users choose to use user terminals for electronic payments. In order to meet users' needs for electronic payments, each card issuer or other institution develops and provides users with applications so that users can complete electronic payments through the applications.

However, payment identifiers, technical specifications, etc., are different between different card issuers and institutions, and the applications developed by each card issuer or institution are also different, making it impossible to uniformly manage payments and making it difficult to manage payments.

SUMMARY

Embodiments of the present disclosure provide a payment method, user terminal, apparatus, device, system and medium, which can uniformly manage payments and reduce the difficulty of payment management.

In the first aspect, embodiments of the present disclosure provide a payment method, which is applied to a payment system. The payment system includes a user terminal, a network-wide payment platform and a host program platform. The user terminal includes an e-commerce application program, a software development kit (SDK) integrated with the e-commerce application program, a host program and a second SDK integrated with the host program. The e-commerce application program belongs to a first entity, the host program belongs to a second entity, and the first SDK and the second SDK belong to a third entity.

The method includes: when the e-commerce application program triggers a payment, the user terminal calls the first SDK to interact with the network-wide payment platform to obtain a first host program list, the first host program list including host program identifiers of at least part of host programs supported by the network-wide payment platform; when calling the first SDK to determine a target host program in the first host program list, the user terminal calls up the target host program; the user terminal calls the second SDK through the target host program to interact with the network-wide payment platform, the network-wide payment platform interacts with the host program platform, and the host program platform performs a resource deduction of a target card to complete the payment using the target card, where the target card is a resource card bound to the target host program.

In the second aspect, embodiments of the present disclosure provide a payment method, which is applied to a user terminal. The user terminal includes an e-commerce application program, an SDK integrated with the e-commerce application program, a host program, and a second SDK integrated with the host program.

The method includes: when the e-commerce application program triggers a payment, calling the first SDK to obtain a first host program list from the network-wide payment platform, where the first host program list includes host program identifiers of at least part of host programs supported by the network-wide payment platform; when the first SDK is called to determine the target host program in the first host program list, the target host program is called up; the second SDK is called through the target host program to interact with the network-wide payment platform, so that the network-wide payment platform interacts with the host program platform to complete the payment using a target card, where the target card is a resource card bound to the target host program.

In the third aspect, embodiments of the present disclosure provide a payment method, which is applied to the network-wide payment platform. The method includes: when an e-commerce application program of a user terminal triggers a payment, providing a first host program list to a first SDK integrated with the e-commerce application program in the user terminal, where the user terminal includes the e-commerce application program, the first SDK, a host program, and a second SDK integrated with the host program, and the first host program list includes host program identifiers of at least part of host programs supported by the network-wide payment platform, and is used to cause the user terminal to call the first SDK to determine and call up a target host program; and interacting with a second SDK, of the target host program, called by the user terminal through a host program platform to complete the payment using a target card, where the target card is a resource card bound to the target host program.

In the fourth aspect, embodiments of the present disclosure provide a payment method, which is applied to the host program platform. The method includes: when an e-commerce application program of a user terminal triggers a payment, interacting with a network-wide payment platform to determine a target card for a payment, where the user terminal includes the e-commerce application program, a first SDK integrated with the e-commerce application program, a host program and a second SDK integrated with the host program, the target card is a resource card bound to a target host program, the target card is determined based on an interaction of a second SDK of the target host program, called by the user terminal, with the network-wide payment platform, and the target host program is a host program determined in a first host program list by the first SDK called by the user terminal, where the first host program list includes host program identifiers of at least some of the host programs supported by the network-wide payment platform; and executing a resource deduction of the target card to complete the payment using the target card.

In the fifth aspect, embodiments of the present disclosure provide a user terminal. The user terminal includes an e-commerce application program, a first SDK integrated with the e-commerce application program, a host program, and a second SDK integrated with the host program, where the user terminal includes a calling module and an interaction module. The calling module is configured to call the first SDK and use the interaction module to obtain a first host program list from a network-wide payment platform when the e-commerce application program triggers a payment, where the first host program list includes host program identifiers of at least part of host programs supported by the network-wide payment platform, and the calling module is further configured to call the first SDK to call up a target host program when the target host program is determined in the first host program list. The calling module is configured to call the second SDK through the target host program and use the interaction module to interact with the network-wide payment platform, so that the network-wide payment platform interacts with a host program platform to complete a payment using a target card, where the target card is a resource card bound to the target host program.

In the sixth aspect, embodiments of the present disclosure provide a payment management apparatus, including an interaction module. The interaction module includes a transmitting unit, where the transmitting unit is configured to provide a first host program list to a first SDK integrated with an e-commerce application program in a user terminal when an e-commerce application program of the user terminal triggers a payment, where the user terminal includes the e-commerce application program, the first SDK, a host program and a second SDK integrated with the host program, and the first host program list includes host program identifiers of at least part of host programs supported by a network-wide payment platform, and is used to cause the user terminal to call the first SDK to determine and call up a target host program. The interaction module is configured to interact with the second SDK and a host program platform called by the user terminal through the target host program to complete a payment using a target card, where the target card is a resource card bound to the target host program.

In the seventh aspect, embodiments of the present disclosure provide a backend service apparatus, including: an interaction module, configured to interact with a network-wide payment platform and determine a target card for a payment when an e-commerce application program of a user terminal triggers a payment, where the user terminal includes the e-commerce application program and a first SDK integrated with the e-commerce application program, a host program and a second SDK integrated with the host program, the target card is a resource card bound to a target host program, the target card is determined according to an interaction between a second SDK of the target host program called by the user terminal and the network-wide payment platform, the target host program is a host program determined from a first host program list by the first SDK called by the user terminal, and the first host program list includes host program identifiers of at least some of host programs supported by the network-wide payment platform; and an execution module, configured to perform a resource deduction of the target card to complete the payment using the target card.

In the eighth aspect, embodiments of the present disclosure provide a user terminal, including: a processor and a memory storing computer program instructions that, when executed by the processor, cause the processor to implement a payment method of the second aspect.

In the ninth aspect, embodiments of the present disclosure provide a payment management device, including: a processor and a memory storing computer program instructions that, when executed by the processor, cause the processor to implement a payment method of the third aspect.

In the tenth aspect, embodiments of the present disclosure provide a backend service device, including: a processor and a memory storing computer program instructions that, when executed by the processor, cause the processor to implement a payment method of the fourth aspect.

In the eleventh aspect, embodiments of the present disclosure provide a payment system, including a user terminal of the eighth aspect, a payment management device of the ninth aspect, and a backend service device of the tenth aspect.

In the twelfth aspect, embodiments of the present disclosure provide a computer-readable storage medium. Computer program instructions are stored on the computer-readable storage medium. When the computer program instructions are executed by a processor, a payment method of any aspect of the first aspect, the second aspect, the third aspect and the fourth aspect is implemented.

Embodiments of the present disclosure provide a payment method, user terminal, apparatus, device, system and medium, where the user terminal includes an e-commerce application program, a first SDK integrated with the e-commerce application program, a host program, and a second SDK integrated with the host program. During the payment process, the first SDK can interact with the network-wide payment platform to obtain a list including host program identifiers of at least part of host programs supported by the network-wide payment platform, so that when the first SDK determines a target host program, the user terminal can call up the target host program. The target host program can call the second SDK integrated by itself. The second SDK can interact with the network-wide payment platform. The network-wide payment platform can interact with the host program platform of the target host program to execute a resource deduction of the target card bound to the target host program, to complete the payment. E-commerce applications and different host programs in user terminals can interact with the network-wide payment platform through their respective integrated SDKs, so that the network-wide payment platform can interact with the host program backends corresponding to different applications. This makes unified payment technical specifications among different card issuers and other institutions in the payment processes, which realizes unified management of payments and reduces the difficulty of payment management.

BRIEF DESCRIPTION OF THE DRAWINGS

In order to explain the technical solutions of the embodiments of the present disclosure more clearly, the drawings essential for the embodiments of the present disclosure will be briefly described below. For those of ordinary skill in the art, without exerting creative efforts, they can also Additional drawings can be obtained from these drawings.

DETAILED DESCRIPTION

Features and exemplary embodiments of various aspects of the present disclosure will be described in detail below. In order to make the purpose, technical solutions and advantages of the present disclosure clearer, the present disclosure will be described in further detail below with reference to the accompanying drawings and specific embodiments. It should be understood that the specific embodiments described here are only intended to explain the application, but not to limit the application. It will be apparent to one skilled in the art that the present disclosure may be practiced without some of these specific details. The following description of embodiments is merely intended to provide a better understanding of the present disclosure by illustrating examples/embodiments thereof.

With the development of payment technology, more and more users choose to use user terminals for electronic payments. In order to meet users' needs for electronic payments, each card issuer or other institution develops and provides users with applications so that users can complete electronic payments through the applications. However, payment identifiers, technical specifications, etc., are different between different card issuers and other institutions, and the applications developed by each card issuer or institution are also different, making it impossible to uniformly manage payments and making it difficult to manage payments.

The embodiments of the present disclosure provide a payment method, user terminal, apparatus, device, system and medium, which can provide a four-party mode for payment based on users, card issuers, card organizations and acquirers, so that all types of electronic payments can be unified in management, reducing the difficulty of payment management.

Figure 1:
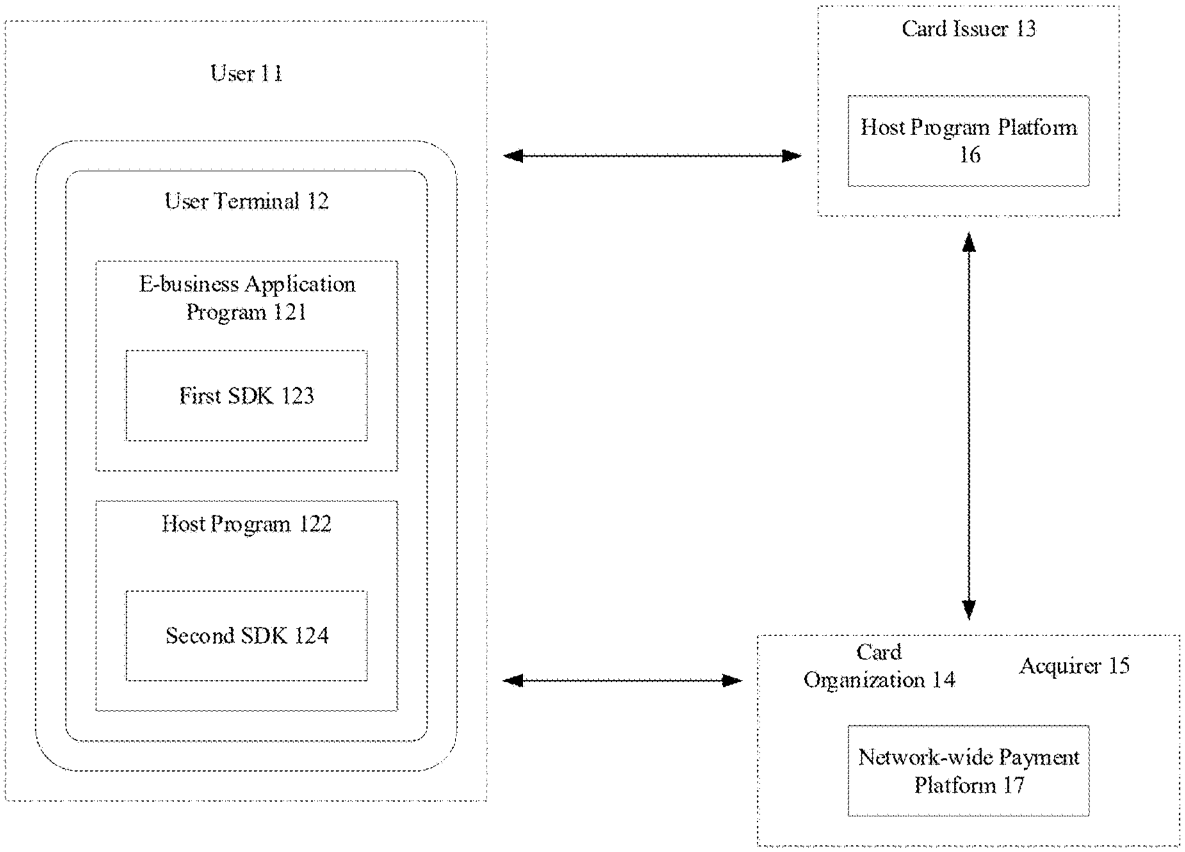
FIG. 1 is a schematic architectural diagram of an example of a four-party mode of user, card issuer, card organization and acquirer in accordance with an embodiment of the present disclosure.

FIG. 1 is a schematic architectural diagram of an example of a four-party mode of user, card issuer, card organization and acquirer in accordance with an embodiment of the present disclosure. As shown in FIG. 1, user 11 can register an account and activate and authorize the payment function in the four-party mode. User 11 can also make a payment through user terminal 12. User terminal 12 in FIG. 1 belongs to user 11. Payment methods may include a payment initiated through e-commerce application programs, QR code payment, etc., which are not limited here. The user terminal 12 may include a mobile phone, a tablet computer, a wearable device and other terminal devices that can perform a payment, and the type of the user terminal 12 is not limited here. The user terminal 12 has an e-commerce application program 121 and a host program 122. The e-commerce application program 121 may include a merchant's application, an e-commerce application program that belongs to a first entity, where the first entity may include a merchant. The host program 122 may include an application program of a card issuer. The host program 122 belongs to a second entity, where the second entity may include a card issuer. The user terminal 12 also has a first SDK 123 and a second SDK 124. The first SDK 123 is integrated with the e-commerce application program 121, and the second SDK 124 is integrated with the host program 122. Each e-commerce application program 121 may be integrated with a first SDK 123, and each host program 122 may be integrated with a second SDK 124. The first SDK 123 and the second SDK 124 belong to a third entity, where the third entity may include a card organization 14 and an acquirer 15.

The card issuer 13 can interface with the system of the card organization 14 through the system to authorize resource card binding and resource deduction channels, and provide users with a payment access through the host program 122. For example, as shown in FIG. 1, the system of the card issuer 13 can be implemented as a host program platform 16. The host program 122 is the front-end service program of the card issuer 13, and the host program platform

16 is the back-end system of the card issuer 13. The host program 122 and the host program platform 16 belong to the second entity. The host program platform 16 may include multiple electronic devices such as servers. The type and number of electronic devices in the host program platform 16 are not limited here. The user terminal 12 can communicate and interact with the host program platform 16 through the host program 122.

The card organization 14 can provide network payment services through the system, and provide the first SDK 123 and the second SDK 124 for the user terminal. The acquirer 15 can receive and process online and offline payment requests. Here, the functions of the card organization 14 and the acquirer 15 can be integrated into one system. For example, as shown in FIG. 1, the functions of the card organization 14 and the acquirer 15 can be realized through a network-wide payment platform 17. The first SDK 123 and the second SDK 124 are the front-end service programs of the card organization 14 and the acquirer 15, and the network-wide payment platform 17 is the back-end system of the card organization 14 and the acquirer 15. The first SDK 123, the second SDK 124 and the network-wide payment platform 17 belong to the third entity. The network-wide payment platform 17 may include multiple electronic devices such as servers. The type and quantity of electronic devices in the network-wide payment platform 17 are not limited here. The user terminal 12 can communicate and interact with the network-wide payment platform 17 through the first SDK 123 and the second SDK 124.

The payment methods, user terminals, apparatuses, devices, systems and media provided by the present disclosure are described in sequence below.

Figure 2:
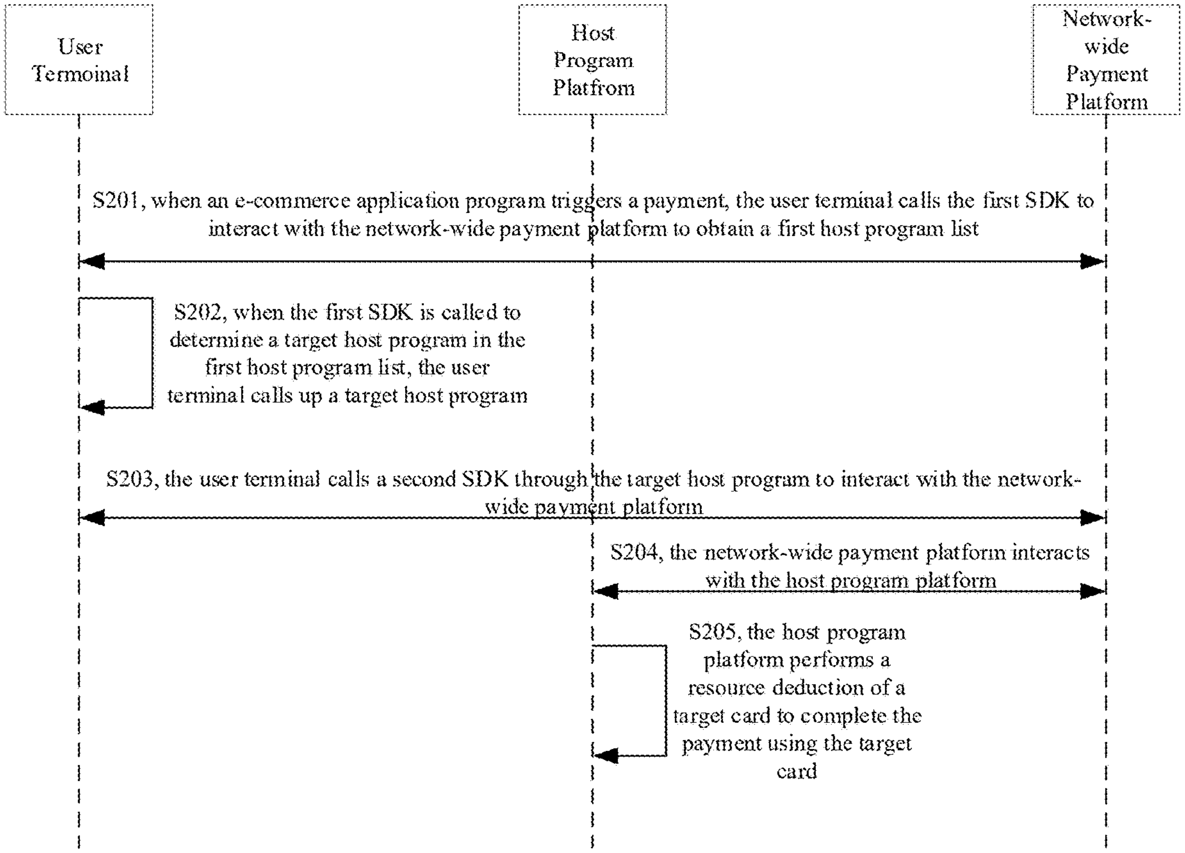
FIG. 2 is a flow chart of an embodiment of a payment method in accordance with the first aspect of the present disclosure.

The first aspect of the present disclosure provides a payment method that can be applied to a payment system, that is, the payment method can be executed by the payment system. The payment system may include a user terminal, a network-wide payment platform, and a host program platform. For details about the user terminal, the network-wide payment platform, and the host program platform, refer to the relevant descriptions in the above embodiments, which will not be repeated here. FIG. 2 is a flow chart of an embodiment of a payment method in accordance with the first aspect of the present disclosure. As shown in FIG. 2, the payment method may include Steps S201 to S205.

In Step S201, when the e-commerce application program triggers a payment, the user terminal calls the first SDK to interact with the network-wide payment platform to obtain a first host program list.

The payment triggered by the e-commerce application program may include the user operating an e-commerce application program in the user terminal, where the payment is triggered by the e-commerce application program. When triggering a payment, the user terminal can utilize the ability of the first SDK to communicate and interact with the network-wide payment platform, call the first SDK to interact with the network-wide payment platform, and obtain the first host program list.

The first host program list is provided by the network-wide payment platform. The first host program list includes host program identifiers of at least part of host programs supported by the network-wide payment platform. The host programs supported by the network-wide payment platform may include host programs authorized to the network-wide payment platform. Specifically, the host programs supported by the network-wide payment platform may include host programs authorized to the network-wide payment platform to activate the four-party mode payment function in the above embodiments.

In some embodiments, the first host program list may include host program identifiers of all host programs supported by the network-wide payment platform.

In some embodiments, the first host program list may include host program identifiers of some host programs supported by the network-wide payment platform. The number of host program identifiers of host programs in the first host program list can be purposefully reduced to improve the accuracy of pushing host programs to users and save transmission resources.

The user terminal can send a first payment request message to the network-wide payment platform through the e-commerce application program. The first payment request message includes a user identifier and is used to instruct the network-wide payment platform to generate a first host program list based on historical payment data corresponding to the user identifier and/or a pre-stored payment priority policy. In response to the first payment request message, the network-wide payment platform obtains the priority order of the host programs supported by the network-wide payment platform based on the historical payment data corresponding to the user identifier and/or the pre-stored payment priority policy. According to a priority order from high to low, the host program identifiers of the top N host programs are retrieved, to obtain the first host program list, where N is a positive integer. That is, the first host program list includes host program identifiers of N host programs arranged from high to low priority. The network-wide payment platform may send a first payment feedback message to the e-commerce application program of the user terminal, where the first payment feedback message includes a first host program list. The user terminal receives the first payment feedback message sent by the network-wide payment platform to obtain the first host program list in the first payment feedback message.

In the case where the first host program list includes host program identifiers of all host programs supported by the network-wide payment platform, N is equal to the number of host programs supported by the network-wide payment platform. In the case where the first host program list includes host program identifiers of some host programs supported by the network-wide payment platform, N is smaller than the number of host programs supported by the network-wide payment platform.

The user identifier is used to identify a user. The historical payment data corresponding to the user identifier is the user's historical payment data. The historical payment data is data generated by the user's previous payments. The historical payment data may include the host program identifiers of the host programs used for historical payments, the payment resource amounts of the host programs used for historical payments, the payment frequencies of the host programs used for historical payments, the payment importance of the host programs used for historical payments, and so on, which is not limited here. In some embodiments, based on the historical payment data corresponding to the user identifier, the priority of the host programs supported by the network-wide payment platform can be determined. For example, through the historical payment data corresponding to the user identifier, the host programs that the user has used in historical payments can be determined, thereby generating the first host program list. A host program that the user has used in historical payments has a higher priority than a host program that the user has not used in historical payments. The first host program list may include the host program identifiers of host programs supported by the network-wide payment platform and used by the user.

The payment priority policy can be used to determine the priority of host programs supported by the network-wide payment platform. The payment priority policy can be set according to application scenarios, needs, etc., which is not limited here. In some embodiments, the host programs supported by the network-wide payment platform can be prioritized according to the payment priority policy. For example, the payment priority policy indicates that the longer the network-wide payment platform supports a host program, the higher the priority of the host program. The first host program list may include the host program identifiers of N host programs that the network-wide payment platform has supported for the longest periods. For another example, the payment priority policy indicates that the higher the credibility of a host program, the higher the priority of the host program. The first host program list may include the host program identifiers of N host programs with the highest credibility on the network-wide payment platform.

In some embodiments, the priority of the host programs supported by the network-wide payment platform can be jointly determined based on the historical payment data corresponding to the user identifier and the payment priority policy. Payment priority policy may include a policy that prioritizes host programs based on historical payment data. For example, the historical payment data includes the payment frequencies of the host programs used by the historical payments, and the payment priority policy indicates that the higher the payment frequency of a host program used by the historical payments, the higher the priority of the host program. The first host program list may include host program identifiers of the N host programs with the most frequent payments.

The order of the host program identifiers in the first host program list reflects the priority of the host programs, which can provide convenience for subsequent determination of a target host program and improve the efficiency of determining the target host program.

In Step S202, when the first SDK is called to determine a target host program in the first host program list, the user terminal calls up the target host program.

The target host program may be a host program determined by the user terminal according to the user's selection, or may be a host program intelligently recommended by the first SDK. The target host program is a host program corresponding to a host program identifier in the first host program list. When the target host program is determined, the first SDK can actively call up the target host program, that is, trigger the start of the target host program, according to the host program identifier assigned to the target host program by the network-wide payment platform. After calling up the target host program, the encrypted order information can also be transmitted to the target host program, so that the target host program can transmit the order information to the second SDK.

In some embodiments, the user terminal can call the first SDK to directly display the first host program list, and determine a host program corresponding to a selected host program identifier in the first host program list as the target host program based on a user's selection input.

In some embodiments, the user terminal may call the first SDK to determine a host program with the highest priority corresponding to a host program identifier in the first host program list as the target host program.

In some embodiments, the user terminal can call the first SDK to obtain a second host program list locally (that is, the user terminal local), call the first SDK to obtain an intersection of the first host program list and the second host program list, and display the intersection. Responding to a first user input, a host program corresponding to the host program identifier specified in the first user input in the intersection is determined as the target host program. The second host program list includes host program identifiers of host programs owned by the user terminal. The host programs supported by the network-wide payment platform may be different from the host programs owned by the user terminal. The user terminal may not have some of the host programs supported by the network-wide payment platform corresponding to the host program identifiers in the first host program list, and the user terminal cannot call up a host program that it does not own. In order to improve the efficiency of determining the target host program, the intersection of the first host program list and the second host program list may be obtained. The intersection includes the host program identifiers of the host programs supported by the network-wide payment platform and also owned by the user terminal. A target host program selected by the user in the intersection can be called up by the user terminal.

In some embodiments, the user terminal can call the first SDK to obtain the second host program list locally, call the first SDK to obtain the intersection of the first host program list and the second host program list, and assign the priority to host programs corresponding to the host program identifiers in the intersection. A host program with the highest priority is determined as the target host program. For details on the second host program list, intersection, and priority, refer to the relevant descriptions in the above embodiments, which will not be repeated here.

The user terminal calls the first SDK to automatically determine the target host program and activate the target host program, which can quickly and accurately provide the user with a host program for payment, providing the user with faster and more convenient payment services.

In Step S203, the user terminal calls the second SDK through the target host program to interact with the network-wide payment platform.

In Step S204, the network-wide payment platform interacts with the host program platform.

In Step S205, the host program platform performs a resource deduction of a target card to complete the payment using the target card.

The target card is a resource card bound to the target host program.

After the target host program is called up, a second SDK can be called through the target host program. The second SDK called here is a second SDK integrated with the target host program. The second SDK interacts with the network-wide payment platform, and the network-wide payment platform interacts with the host program platform. The host program platform determines a target card and performs a resource deduction on the target card to complete the payment using the target card. The host program platform that interacts with the network-wide payment platform is a host program platform corresponding to the target host program. The target card is a resource card bound to the target host program. The target card can be a default resource card used for payment by the target host program, or can be a resource card selected by the user among the resource cards bound to the target host program. The target card can be switched according to the user's needs and is not limited here. The confirmation of the target card can be determined based on the interaction between the second SDK and the network-wide payment platform and the interaction between the network-wide payment platform and the host program platform.

In the embodiments of the present disclosure, the user terminal includes an e-commerce application program, a first SDK integrated with the e-commerce application program, a host program, and a second SDK integrated with the host program. During a payment process, the first SDK can interact with the network-wide payment platform to obtain a list including host program identifiers of at least part of host programs supported by the network-wide payment platform, so that when the first SDK determines a target host program, the user terminal can call up the target host program. The target host program can call the second SDK integrated by itself. The second SDK can interact with the network-wide payment platform. The network-wide payment platform can interact with the host program platform of the target host program to execute the resource deduction of the target card bound to the target host program, to complete the payment. E-commerce applications and different host programs in user terminals can interact with the network-wide payment platform through their respective integrated SDKs, so that the network-wide payment platform can interact with the host program backends corresponding to different applications. This makes the unified payment technical specifications and unified payment identifiers among different card issuers and other institutions during the payment processes, thereby realizing unified management of payments and reducing the difficulty of payment management.

The host program platforms corresponding to different host programs share the same network-wide payment platform. By providing a unified SDK for different host programs and e-commerce application programs, payment capabilities are offered to different host programs and e-commerce application programs. This makes different host programs and e-commerce application programs share the same network-wide payment platform through their respective integrated SDKs, and share online and offline payment acceptance networks and industry content. Payment management is no longer subject to restrictions of a host program of the card issuer or other institution to which the payment account belongs, thereby improving operational efficiency, reducing operating costs and construction costs, and expanding the scope of payment acceptance. A user does not need to use different operating methods for different host program payments, and the user's payment experience is unified, which improves a user's payment experience.

In some embodiments, before Step S201, the user terminal can also interact with the network-wide payment platform to obtain order information corresponding to the payment to facilitate subsequent payment initiation. Specifically, in response to a second user input, the user terminal initiates an order request to the network-wide payment platform through the e-commerce application program. The order request is used to request order information from the network-wide payment platform. In response to the order request, the network-wide payment platform can provide order information to the e-commerce application program. Order information may include order number, order amount, order details and other information, which is not limited here. The e-commerce application program of the user terminal receives the order information and can display an order page according to the order information. The order page includes order information. In response to a third user input to the order page, the user terminal triggers a payment. The third user input is the user's payment triggering input. In response to the input, the user terminal may trigger Step S201.

Figure 3:
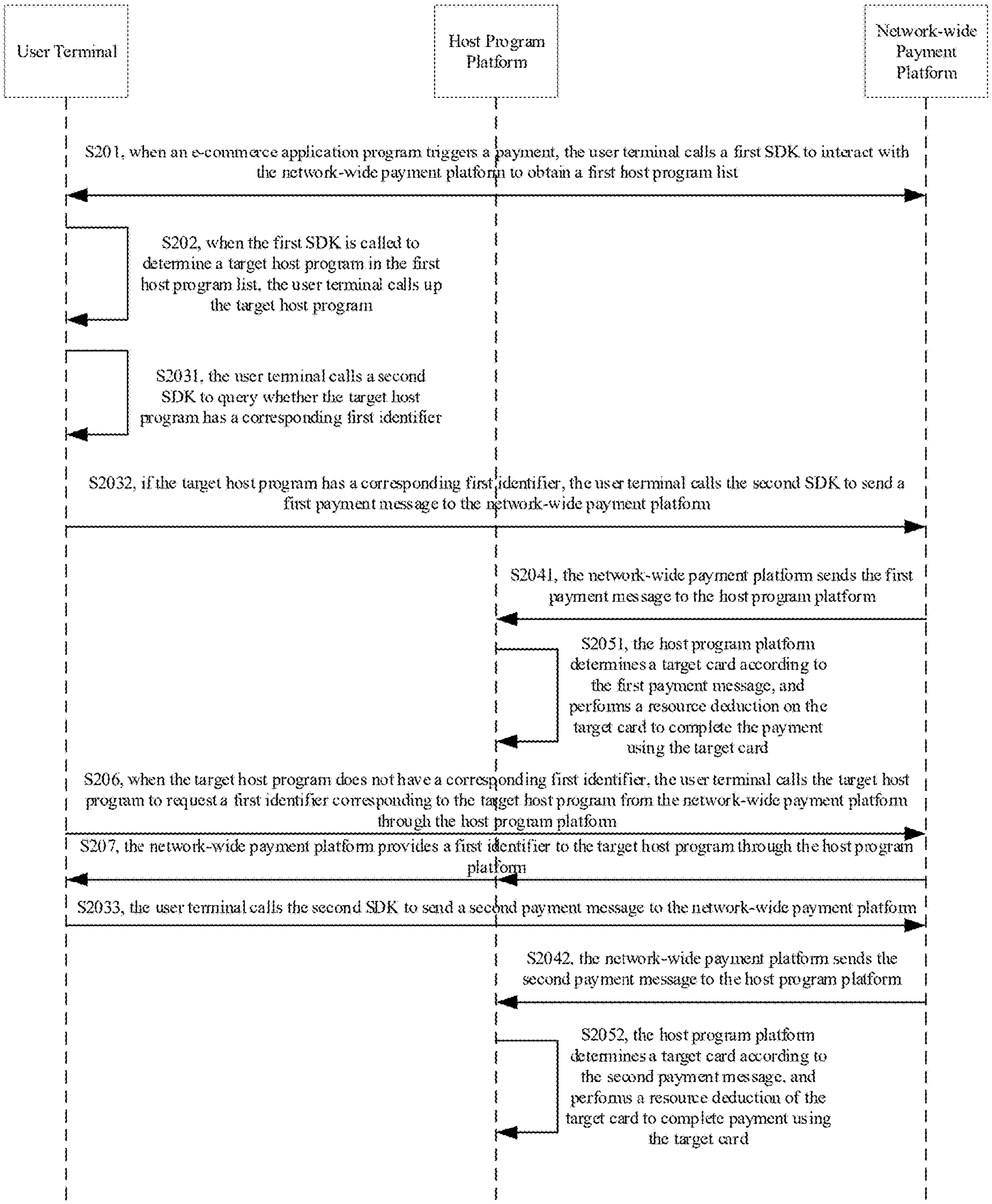
FIG. 3 is a flow chart of another embodiment of a payment method in accordance with the first aspect of the present disclosure.

In some embodiments, a first identifier can be assigned to a host program that has the function of making payments using the network-wide payment platform, so that during the payment process, the first identifier can be used to determine whether the current payment can adopt a payment method in the embodiments of the present disclosure to proceed. FIG. 3 is a flow chart of another embodiment of a payment method in accordance with the first aspect of the present disclosure. The difference between FIG. 3 and FIG. 2 is that Step S203 in FIG. 2 can be specifically refined into Steps S2031 to Step S2033 in FIG. 3, Step S204 in FIG. 2 can be specifically refined into Steps S2041 and S2042 in FIG. 3, and Step S205 in FIG. 2 can be specifically refined into Step S2051 and Step S2052 in FIG. 3. The payment method in FIG. 3 can also include Step S206 and Step S207.

In Step S2031, the user terminal calls the second SDK to query whether the target host program has a corresponding first identifier.

The first identifier is used to indicate that a user account in a host program has the function of making payments using the network-wide payment platform. The first identifier can also indicate the binding relationship between the user account in the host program and the network-wide payment platform. The first identifier can be assigned by the network-wide payment platform to a user account in a host program. The same user can have different first identifiers in different host programs. Different users have different first identifiers in the same host program. A first identifier can be implemented as a string, a serial number, etc., which is not limited here. A first identifier may have a validity period. During the validity period, the first identifier is valid. If the validity period is passed, the first identifier is invalid and a new first identifier needs to be requested/applied. The validity period can be a fixed length of time, or can be related to the login status of the user account. The validity period can be set according to the application scenario, needs, etc., which is not limited here.

In some embodiments, if the target host program has a corresponding first identifier, after the first identifier application is successful, the user terminal will obtain the first identifier and store the first identifier locally in the user terminal. The user terminal can call the second SDK to locally query whether the target host program has the corresponding first identifier.

In some embodiments, if the target host program has a corresponding first identifier, after the first identifier application is successful, the network-wide payment platform will store the first identifier. The user terminal can call the second SDK to initiate a query request to the network-wide payment platform, and the network-wide payment platform checks whether the target host program has the corresponding first identifier.

In Step S2032, if the target host program has a corresponding first identifier, the user terminal calls the second SDK to send a first payment message to the network-wide payment platform.

The target host program has the corresponding first identifier, indicating that the user account in the target host program has the function of making payments using the network-wide payment platform and can continue the payment process. The user terminal calls the second SDK to send a first payment message to the network-wide payment platform. The first payment message includes a host program identifier of the target host program and the first identifier corresponding to the target host program.

In Step S2041, the network-wide payment platform sends the first payment message to the host program platform.

The network-wide payment platform determines, based on the first identifier corresponding to the target host program, that the user account in the target host program has the function of making payments using the network-wide payment platform, and can determine the target host program based on the host program identifier of the target host program, thereby determining the host program platform of the target host program, so as to send the first payment message to the host program platform of the target host program.

In Step S2051, the host program platform determines a target card according to the first payment message, and performs a resource deduction on the target card to complete the payment using the target card.

In some embodiments, the first payment message may include card information. The card information in the first payment message may indicate the target card. The host program platform of the target host program can determine the target card according to the first payment message, and perform a resource deduction of the target card to complete the payment using the target card.

In Step S206, when the target host program does not have a corresponding first identifier, the user terminal calls the target host program to request the first identifier corresponding to the target host program from the network-wide payment platform through the host program platform.

The target host program does not have a corresponding first identifier, which means that the user account in the target host program does not have the function of making payments using the network-wide payment platform or the original first identifier of the target host program has expired. Under such a circumstance, the user terminal needs to request a first identifier corresponding to the target host program from the network-wide payment platform. The network-wide payment platform will assign a first identifier to the target host program and provide the first identifier to the target host program through the host program platform, that is, the user account in the host program of the user terminal device is authorized with a function to make payments using the network-wide payment platform.

In some embodiments, when logging in to the target host program, the user terminal calls the target host program to send a first identifier request message to the host program platform. The first identifier request message includes user identity information. User identity information includes information related to the user's identity, which may include the user's name, user's ID number, user's mobile phone number, user's resource card number, etc. To ensure data security, user identity information may be encrypted information.

In response to the first identifier request message, the host program platform sends a second identifier request message to the network-wide payment platform. The second identifier request message is used to request the first identifier. The second identifier request message includes the user identity information and the host program identifier. The host program identifier here is specifically the host program identifier of the target host program. In some embodiments, the second identifier request message may also include the user account of the user in the target host program.

In Step S207, the network-wide payment platform provides a first identifier to the target host program through the host program platform.

The network-wide payment platform responds to the second identifier request message and provides a first identifier to the target host program. In some embodiments, after the user activates the identity information of the user who uses the network-wide payment platform to make a payment, the network-wide payment platform may not assign a first identifier to the user's user account at the card issuer or other institution. Instead, a first identifier is assigned to the user account in the host program when the user uses the host program of the card issuer or other institution to make a payment.

In some embodiments, the network-wide payment platform can assign a first identifier to the target host program based on the user identity information, the host program identifier and the pre-stored activated user identity information. The identity information of activated users pre-stored by the network-wide payment platform includes the identity information of users who have activated the function of making payments using the network-wide payment platform. After assigning a first identifier to the target host program, the network-wide payment platform sends a second identifier feedback message to the host program platform. The second identifier feedback message includes the assigned first identifier. The host program platform may send a first identifier feedback message to the target host program in the user terminal according to the second identifier feedback message. The first identifier feedback message may include the first identifier.

The network-wide payment platform can match user identity information and activated user identity information, and assign the first identifier based on the matching result of user identity information and activated user identity information. If the user identity information matches the user identity information of a user(s) that has been activated, the network-wide payment platform can assign a first identifier. In addition, depending on the specific matching of the user identity information, it is determined whether it is necessary to bind a user account corresponding to the user identity information in the target host program with a user account corresponding to the user identity information in the network-wide payment platform. If the user identity information does not match the user identity information of a user(s) that has been activated, it means that the user identity information does not have a user account created yet in the network-wide payment platform, and the network-wide payment platform needs to create a user account corresponding to the user's identity information in the network-wide payment platform.

In some embodiments, the user identity information includes a first user unique identifier and a first phone number, and the activated user identity information includes a second user unique identifier and a second phone number. The first user unique identifier is a user unique identifier in the user identity information. The second user unique identifier is a user unique identifier in the activated user identity information. A user unique identifier is used to identify a user and is unique. Different users have different user unique identifiers. For example, a user unique identifier may include an ID number, which is not limited here. The first phone number is the phone number of the user in the user identity information, and the second phone number is the phone number of the user in the activated user identity information.

In the case where the activated user identity information includes a unique identifier of a target second user, the network-wide payment platform binds a first user account and a second user account and generates the first identifier.

The unique identifier of the target second user is a second user unique identifier that is consistent with the first user unique identifier. For a user, the user has only one user account in the network-wide payment platform, and the user has different user accounts in different host programs. The first user account is a user account in the target host program corresponding to the first user unique identifier, that is, the first user account is the user account in the target host program of the user represented by the first user unique identifier. The second user account is a user account corresponding to the target second user unique identifier and a target second phone number in the network-wide payment platform. The target second phone number is a second phone number that is consistent with the first phone number. That is, the second user account can be regarded as a user account in the network-wide payment platform represented by the unique identifier of the target second user and the target second phone number.

The identity information of an activated user includes the identity information of a user who has activated the function of making payments using the network-wide payment platform. The identity information of an activated user includes the unique identifier of the target second user, indicating that the user represented by the first user unique identifier has activated the function of payment using the network-wide payment platform. The user has a user account of the network-wide payment platform, and the first user account is bound to the second user account.

In the case where the activated user identity information only has one piece of information including the unique identifier of the target second user, regardless of whether the activated user identity information includes a second phone number that is consistent with the first phone number, the first user account and the second user account binding is to bind the user's user account in the target host program with the user's user account in the network-wide payment platform, and generate a first identifier.

When there are two or more pieces of information including the unique identifier of the target second user in the activated user identity information and the second phone numbers in the two or more pieces of information are different, based on the two or more pieces of information, a user account in the network-wide payment platform whose second user unique identifier is consistent with the first user unique identifier and whose second phone number is consistent with the first phone number is selected, and this selected user account shall be regarded as the second user account. The first user account and the second user account are bound to generate the first identifier.

When the identity information of the activated user does not include the unique identifier of the target second user, the network-wide payment platform creates a new third user account, binds the first user account and the third user account, and generates the first identifier.

The third user account is a user account corresponding to the first user unique identifier in the network-wide payment platform. The identity information of the activated user does not include the unique identifier of the target second user, which means that there is no user account corresponding to the first user unique identifier among the user accounts of the network-wide payment platform. For the first user unique identifier, a user account of the user represented by the first user unique identifier in the network-wide payment platform, that is, a third user account, can be created, the first user account and the third user account can be bound, and the first identifier can be generated.

In some embodiments, the activated user identity information does not include the unique identifier of the target second user, but includes a second phone number that is consistent with the first phone number, and has a user account corresponding to the second phone number on the network-wide payment platform. Under such a circumstance, if the second phone number has been real-named, based on payment security considerations such as whether the first phone number is incorrect, the first user account will not be bound to the user account corresponding to the second phone number in the network-wide payment platform. If the second phone number does not have a real-name, real-name verification can be carried out through the operator of the second phone number. If the real-name information of the second phone number at the operator is consistent with the first user unique identifier, and the user account corresponding to the second phone number in the network-wide payment platform has not been bound to the first user account, the first user account can be bound to the user account corresponding to the second phone number in the network-wide payment platform, and the first identifier can be generated.

In Step S2033, the user terminal calls the second SDK to send a second payment message to the network-wide payment platform.

The second payment message includes the host program identifier of the target host program and the first identifier corresponding to the target host program. The first identifier corresponding to the target host program is the first identifier assigned by the network-wide payment platform in Step S207.

In Step S2042, the network-wide payment platform sends the second payment message to the host program platform.

In Step S2052, the host program platform determines a target card according to the second payment message, and performs a resource deduction of the target card to complete the payment using the target card.

For the specific content of Step S2033, Step S2042 and Step S2052, refer to the relevant content of Step S2032, Step S2041 and Step S2051, which will not be repeated here.

In some embodiments, before Step S2032 and Step S2033, the version of the second SDK, the login status of the second SDK, and/or the security of the user account in the target host program and the resource transfer-in account, etc., can be detected. If the detection passes, Step S2032 and Step S2033 are then executed to ensure the security and reliability of the payment.

The detection of the version of the second SDK may include the following steps a1 and a2.

a1: the user terminal calls the second SDK of the target host program to send a version determination message to the network-wide payment platform.

The version determination message may include version information of the second SDK of the target host program. The version information of the second SDK represents the version of the second SDK.

a2: the network-wide payment platform determines whether the version of the second SDK is an available version based on the version determination message, and sends a version feedback message to the second SDK of the target host program.

The network-wide payment platform can obtain the version information of the second SDK from the version determination message, and determine whether the version represented by the version information of the second SDK is an available version of the network-wide payment platform. The network-wide payment platform uses a version feedback message to feedback to the second SDK of the user terminal whether the version of the second SDK is an available version. The version feedback message indicates whether the version of the second SDK is an available version. For example, the available versions in the network-wide payment platform include version 1.20, version 1.21 and version 1.22, and the version information of the second SDK in the version determination message represents version 1.05, then the version feedback message sent by the network-wide payment platform indicates that the version of the second SDK is not an available version. If the version feedback message indicates that the version of the second SDK is not an available version, Steps S2032 and S2033 are not performed, and the user terminal may prompt the user to upgrade the second SDK. If only the version of the second SDK is detected, and the version feedback message indicates that the version of the second SDK is an available version, Steps S2032 and S2033 can be performed. If in addition to detecting the version of the second SDK, other tests need to be performed, and if the version feedback message indicates that the version of the second SDK is an available version, it can be determined whether to perform Steps S2032 and S2033 based on the results of the other tests.

The detection of the login status of the second SDK may include the following steps b1 and b2.

b1: the user terminal calls the second SDK of the target host program to send an SDK login determination message to the network-wide payment platform.

The SDK login determination message may include information used to identify the second SDK of the target host program. For example, the SDK login determination message may include the SDK identifier of the second SDK or the host program identifier of the target host program.

b2: the network-wide payment platform determines whether the second SDK is logged in based on the SDK login determination message, and sends an SDK login feedback message to the second SDK of the target host program.

The network-wide payment platform can determine whether the second SDK is logged in based on the information in the SDK login determination message. The network-wide payment platform can feedback to the second SDK of the user terminal whether the second SDK is logged in through the SDK login feedback message. The SDK login feedback message can indicate whether the second SDK is logged in. If the SDK login feedback message indicates that the second SDK has not been logged in, Steps S2032 and S2033 are not performed, and the user terminal may prompt the user to log in to the second SDK. If only the login status of the second SDK is detected and the SDK login feedback message indicates that the second SDK has been logged in, Steps S2032 and S2033 may be performed. If in addition to detecting the login status of the second SDK, other tests need to be performed, and if the SDK login feedback message indicates that the second SDK has been logged in, it can be determined whether to perform Steps S2032 and S2033 based on the results of the other tests.

Detecting the security of the user account in the target host program and the resource transfer-in account may include the following steps c1 and c2.

c1: the user terminal calls the second SDK of the target host program to send a security determination message to the network-wide payment platform.

The security determination message may include the user account in the target host program and the resource transfer-in account for this payment.

c2: the network-wide payment platform determines whether the user account in the target host program and the resource transfer-in account for this payment are safe based on the security determination message, and sends a security feedback message to the second SDK of the target host program.

Based on the security determination message, the network-wide payment platform searches for the historical payment data and other related data of the user account in the target host program. The network-wide payment platform can also search for the historical payment data and other related data of the resource transfer-in account for this payment. Based on the historical payment data and other related data of the user account in the target host program and the security determination policy preset by the network-wide payment platform, it can be determined whether the user account in the target host program is safe. In addition, based on the historical payment data and other relevant data of the resource transfer-in account for this payment and the security determination strategy preset by the network-wide payment platform, it can be determined whether the resource transfer-in account for this payment is safe. The network-wide payment platform uses a security feedback message to feedback to the second SDK of the user terminal whether the user account in the target host program and the resource transfer-in account are safe. The security feedback message indicates whether the user account in the target host program and the resource transfer-in account are safe. If the security feedback message indicates that the user account in the target host program and the resource transfer-in account are unsafe, Steps S2032 and S2033 are not executed, and the user terminal may prompt the user to suspend payment or perform security verification. If only the security of the user account in the target host program and the resource transfer-in account is tested, and the security feedback message indicates that the user account in the target host program and the resource transfer-in account are safe, Steps S2032 and S2033 may be performed. If in addition to testing the security of the user account in the target host program and the resource transfer-in account, other tests need to be performed. When the security feedback message indicates that the user account in the target host program and the resource transfer-in account are safe, whether to execute Step S2032 and Step S2033 can be determined based on the results of other detections.

The network-wide payment platform tests the security of the user account and resource transfer-in account, allowing each host program to share security detection strategies, which can improve the overall security monitoring and processing level of the payment industry and provide better protection for payment security.

Figure 4:
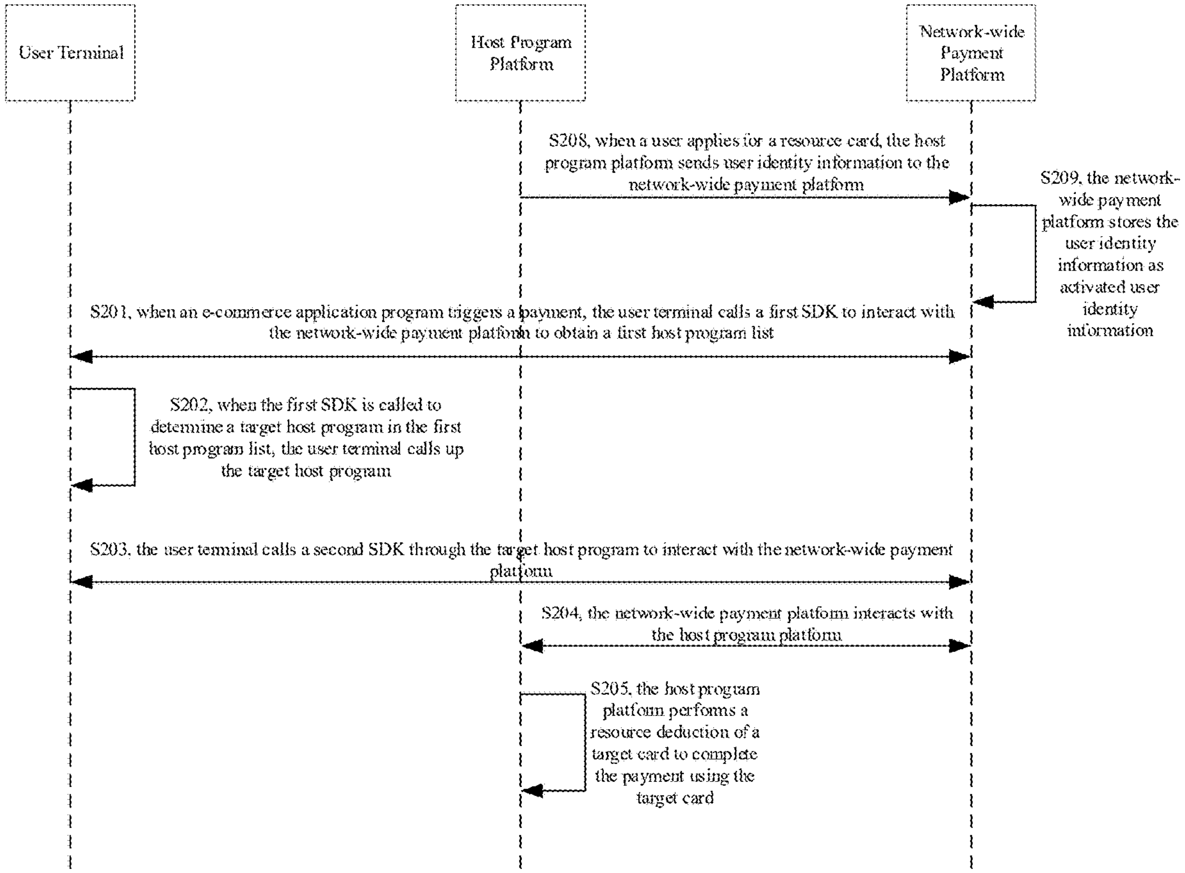
FIG. 4 is a flow chart of another embodiment of a payment method in accordance with the first aspect of the present disclosure.

In some embodiments, in order to simplify the process for a user to activate the payment function using the network-wide payment platform, a user can directly activate the payment function using the network-wide payment platform when the user opens a card at the card issuer or through the user terminal. FIG. 4 is a flow chart of yet another embodiment of a payment method in accordance with the first aspect of the present disclosure. The difference between FIG. 4 and FIG. 2 is that the payment method shown in FIG. 4 may also include Step S208 and Step S209.

In Step S208, when a user applies for a resource card, the host program platform sends user identity information to the network-wide payment platform.

When a user applies for a resource card, the user's identity information will be retained in a host program platform to which the resource card belongs. The host program platform will send the user identity information to the network-wide payment platform. For the specific content of the user identity information, refer to the relevant descriptions in the above embodiments, which will not be repeated here.

In Step S209, the network-wide payment platform stores the user identity information as activated user identity information.

The network-wide payment platform stores the user identity information as the activated user identity information, so that when the terminal device applies for the first identifier to the network-wide payment platform subsequently, the activated user identity information can be used to provide the first identifier for the user's host program. For specific details, refer to the relevant descriptions in the above embodiments, which will not be repeated here.

The function of making payments on the network-wide payment platform is activated when a user opens the card, which can reduce the user's operations to activate the payment function, simplify the process of activating the payment function, and improve the efficiency of function activation and user experience.

In the embodiments of the present disclosure, the user terminal can also make a payment based on a payment code and a collection code.

In the scenario where the user terminal uses a payment code to pay, the user terminal can call the second SDK to initiate a payment code request to the network-wide payment platform. In response to the payment code request, the network-wide payment platform issues a payment code to the second SDK. The user terminal can call the second SDK to display the payment code, so that the payment code is scanned by a payment acceptance terminal. The payment acceptance terminal scans the payment code and initiates a payment request to the network-wide payment platform. The network-wide payment platform receives the payment request initiated by the payment acceptance terminal by scanning the payment code, and interacts with the host program platform to complete a payment indicated by the payment request. The payment acceptance terminal may include point of sales (POS) equipment and so on, which is not limited here. In the scenario where the user terminal displays the payment code for payment, the user terminal calls the second SDK to request and display the payment code, so that payment where the payment code scanned by the payment acceptance terminal can be uniformly managed by the network-wide payment platform.

In the scenario where the user terminal scans a collection code for payment, the user terminal calls the second SDK to scan the collection code and initiates a payment request to the network-wide payment platform. The network-wide payment platform interacts with the host program platform to complete a payment indicated by the payment request. In the case where the user terminal scans the collection code to realize payment, the scanning function of the user terminal is the scanning function managed by the second SDK, so that the payment by scanning the collection code can be uniformly managed by the network-wide payment platform.

Figure 5:
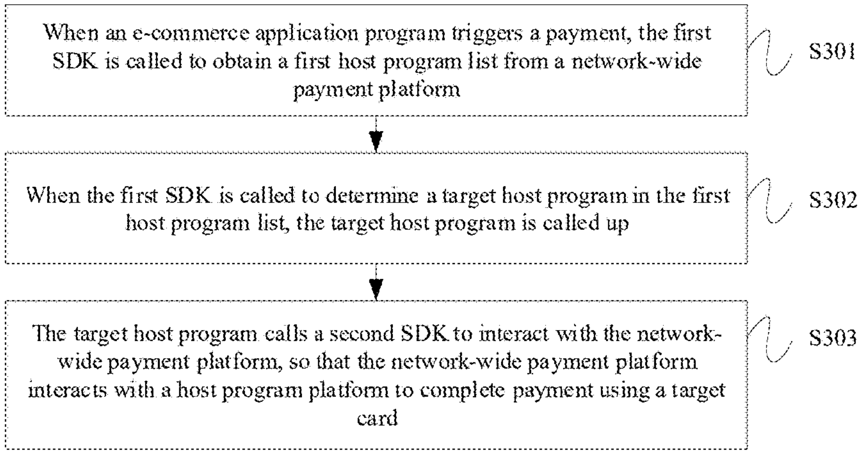
FIG. 5 is a flow chart of an embodiment of a payment method in accordance with the second aspect of the present disclosure.

The second aspect of the present disclosure provides a payment method, which is applied to a user terminal, that is, the payment method can be executed by the user terminal. For the specific content of the user terminal, refer to the relevant descriptions in the above embodiments, which will not be repeated here. FIG. 5 is a flow chart of an embodiment of the payment method in accordance with the second aspect of the present disclosure. As shown in FIG. 5, the payment method may include Steps S301 to S303.

In Step S301, when an e-commerce application program triggers a payment, a first SDK is called to obtain a first host program list from a network-wide payment platform.

In some embodiments, a user terminal may send a first payment request message to the network-wide payment platform through the e-commerce application program. The first payment request message includes a user identifier and is used to instruct the network-wide payment platform to generate a first host program list based on historical payment data corresponding to the user identifier and/or a pre-stored payment priority policy. The first host program list includes host program identifiers of N host programs arranged from high to low priority, where N is a positive integer. The user terminal receives a first payment feedback message sent by the network-wide payment platform. The first payment feedback message includes the first host program list.

In Step S302, when the first SDK is called to determine a target host program in the first host program list, the target host program is called up.

In some embodiments, before calling up the target host program, the user terminal can call the first SDK to obtain a second host program list locally, call the first SDK to obtain an intersection of the first host program list and the second host program list, and display the intersection. In response to a first user input, a host program, in the intersection, corresponding to a host program identifier specified in the first user input is determined as the target host program. The second host program list includes host program identifiers of host programs owned by the user terminal.

In some embodiments, before calling up the target host program, the user terminal can call the first SDK to obtain the second host program list locally, and call the first SDK to obtain an intersection of the first host program list and the second host program list. The host program with the highest priority corresponding to a host program identifier in the intersection is determined as the target host program. The second host program list includes host program identifiers of host programs owned by the user terminal.

In Step S303, the target host program calls the second SDK to interact with the network-wide payment platform, so that the network-wide payment platform interacts with the host program platform to complete a payment using the target card.

For the specific content of Steps S301 to S303, refer to the relevant descriptions in the above embodiments, which will not be repeated here.

In the embodiments of the present disclosure, the user terminal includes an e-commerce application program, a first SDK integrated with the e-commerce application program, a host program, and a second SDK integrated with the host program. During the payment process, the first SDK can interact with the network-wide payment platform to obtain a list including host program identifiers of at least part of host programs supported by the network-wide payment platform, so that when the first SDK determines the target host program, the user terminal can call up the target host program. The target host program can call the second SDK integrated by itself. The second SDK can interact with the network-wide payment platform. The network-wide payment platform can interact with the host program platform of the target host program to execute a resource deduction of the target card bound to the target host program, to complete the payment. E-commerce applications and different host programs in user terminals can interact with the network-wide payment platform through their respective integrated SDKs, so that the network-wide payment platform can interact with the host program backends corresponding to different applications. This makes unified payment technical specifications among different card issuers and other institutions in the payment processes, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

In some embodiments, before Step S301, the user terminal can also interact with the network-wide payment platform to obtain the order information corresponding to the payment, so as to facilitate subsequent payment initiation. The user terminal can obtain order information from the network-wide payment platform through the e-commerce application program in response to a second user input, and trigger payment in response to a third user input on an order page. The order page includes order information. The user terminal can also interact with the network-wide payment platform. For the specific content of obtaining the order information, refer to the relevant descriptions in the above embodiments, which will not be repeated here.

Figure 6:
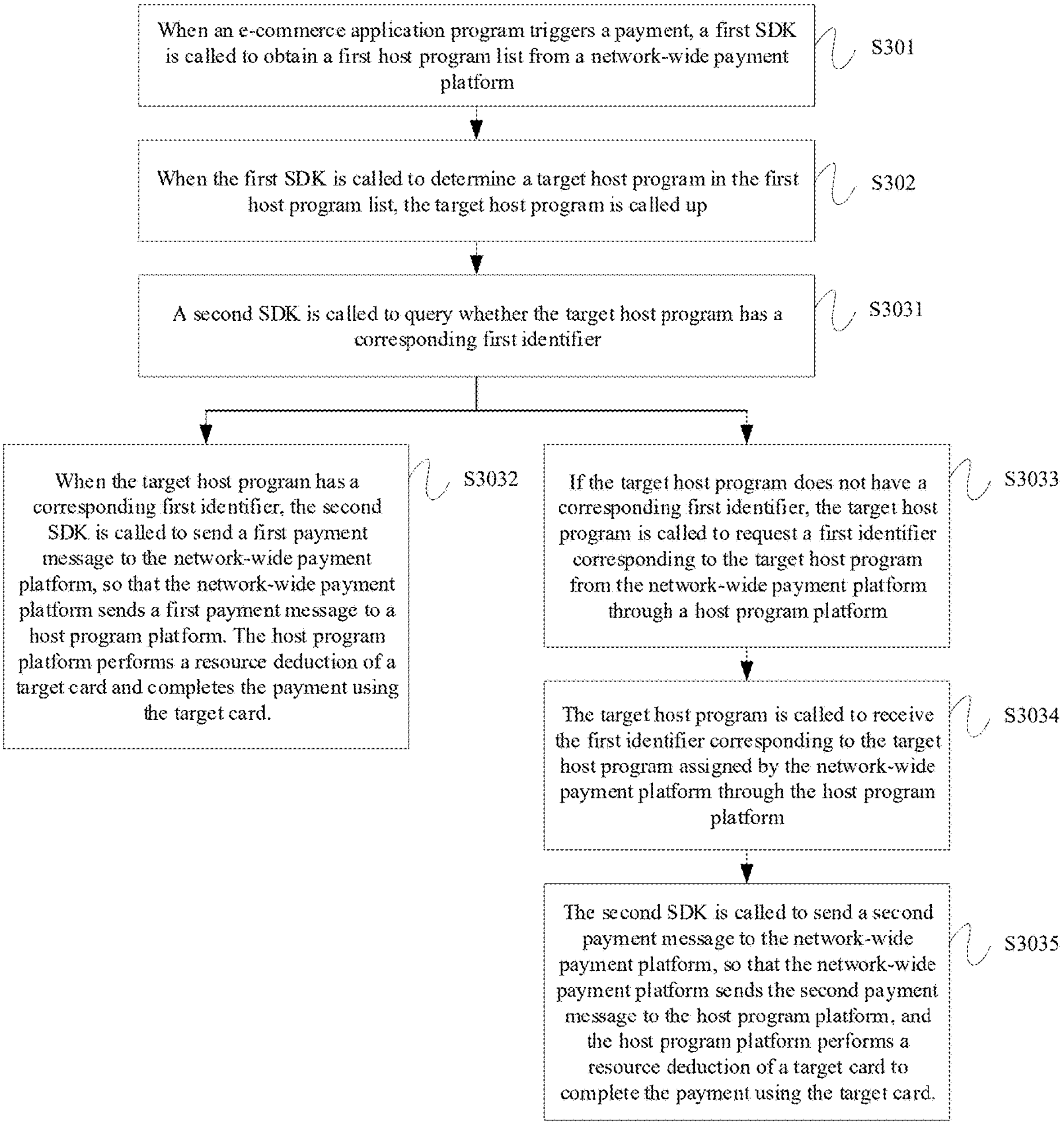
FIG. 6 is a flow chart of another embodiment of a payment method in accordance with the second aspect of the present disclosure.

In some embodiments, a first identifier can be assigned to a host program that has the function of making payments using the network-wide payment platform, so that during the payment process, it can be determined whether the current payment can be made using the payment method in the embodiments of the present disclosure. FIG. 6 is a flow chart of another embodiment of a payment method in accordance with the second aspect of the present disclosure. The difference between FIG. 6 and FIG. 5 is that Step S303 in FIG. 5 can be specifically refined into Steps S3031 to Step S3035 in FIG. 6.

In Step S3031, the second SDK is called to query whether the target host program has a corresponding first identifier.

In Step S3032, when the target host program has a corresponding first identifier, the second SDK is called to send a first payment message to the network-wide payment platform, so that the network-wide payment platform sends the first payment message to the host program platform. The host program platform performs a resource deduction of the target card and completes the payment using the target card.

The first payment message includes a host program identifier of the target host program and a first identifier corresponding to the target host program.

In Step S3033, if the target host program does not have a corresponding first identifier, the target host program is called to request a first identifier corresponding to the target host program from the network-wide payment platform through the host program platform.

In some embodiments, when logging into the target host program, the user terminal calls the target host program to send a first identifier request message to the host program platform. The user terminal calls the target host program to receive a first identifier feedback message sent by the host program platform.

The first identifier request message includes user identity information and is used to instruct the host program platform to send a second identifier request message to the network-wide payment platform. The second identifier request message is used to request the first identifier. The second identifier request message includes user identity information and a host program identifier. The first identifier feedback message includes the first identifier. The first identifier feedback message is generated based on a second identifier feedback message sent by the network-wide payment platform to the host program platform. The second identifier feedback message includes the first identifier. The first identifier is obtained by the network-wide payment platform based on the user identity information, the host program identifier and pre-stored user identity information.

In Step S3034, the target host program is called to receive the first identifier corresponding to the target host program assigned by the network-wide payment platform through the host program platform.

In Step S3035, the second SDK is called to send a second payment message to the network-wide payment platform, so that the network-wide payment platform sends the second payment message to the host program platform, and the host program platform performs a resource deduction of the target card to complete the target card payment.

The second payment message includes the host program identifier of the target host program and the first identifier corresponding to the target host program.

For the specific content of the above Steps S3031 to Step S3035, refer to the relevant descriptions in the above embodiments, which will not be repeated here.

In some embodiments, before the above Steps S3032 and S3035, the version of the second SDK, the login status of the second SDK, and/or the security of the user account in the target host program and the resource transfer-in account, etc., can be detected.

In an embodiment where the version of the second SDK needs to be detected, the user terminal can call the second SDK of the target host program to send a version determination message to the network-wide payment platform, and receive a version feedback message sent by the network-wide payment platform through the second SDK of the target host program. The version determination message instructs the network-wide payment platform to determine whether the version of the second SDK is an available version. The version feedback message indicates whether the version of the second SDK is an available version. For the specific content of detecting the version of the second SDK, refer to the relevant descriptions in the above embodiments, which will not be repeated here.

In an embodiment where the login status of the second SDK needs to be detected, the user terminal can call the second SDK of the target host program to send an SDK login determination message to the network-wide payment platform, and receive an SDK login feedback message sent by the network-wide payment platform through the second SDK of the target host program. The SDK login determination message instructs the network-wide payment platform to determine whether the second SDK is logged in. The SDK login feedback message indicates whether the second SDK version is logged in. For the specific content of detecting the login status of the second SDK, refer to the relevant descriptions in the above embodiments, which will not be repeated here.

In an embodiment where it is necessary to detect the security of the user account in the target host program and the resource transfer-in account, the user terminal can call the second SDK of the target host program to send a security determination message to the network-wide payment platform, and receive a security feedback message sent by the network-wide payment platform through the target host program's second SDK. The security determination message instructs the network-wide payment platform to determine whether the user account in the target host program and resource transfer-in account for this payment are safe. The security feedback message indicates whether the user account in the target host program and the resource transfer-in account are safe. For the specific content on detecting the security of the user account in the target host program and the resource transfer-in account, refer to the relevant descriptions in the above embodiments, which will not be repeated here.

In some embodiments, the activated user identity information includes the user identity information sent by the host program platform to the network-wide payment platform when the user applies for a resource card. For specific details, refer to the relevant descriptions in the above embodiments, which will not be repeated here.

In some embodiments, the user terminal can also make a payment based on a payment code. The user terminal can call the second SDK to obtain the payment code from the network-wide payment platform. The payment code is used for scanning by a payment acceptance terminal to initiate a payment request to the network-wide payment platform. The specific content of payment by the user terminal according to the payment code can be found in the relevant descriptions in the above embodiments, which will not be repeated here.

In some embodiments, the user terminal can also make a payment based on a collection code. The user terminal can call the second SDK to scan the collection code and initiate a payment request to the network-wide payment platform. The specific content of payment by the user terminal according to the collection code can be found in the relevant descriptions in the above embodiments, which will not be repeated here.

Figure 7:
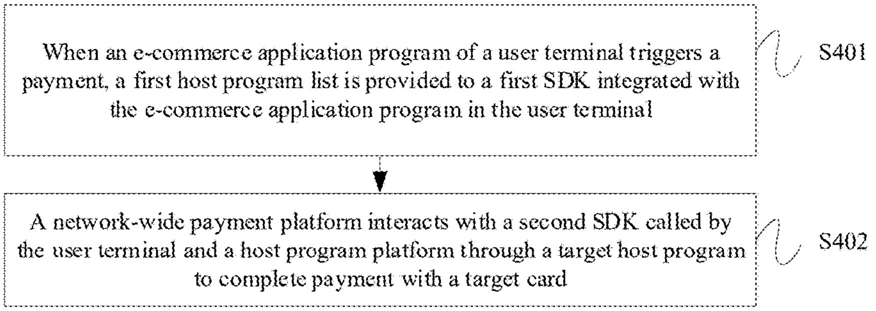
FIG. 7 is a flow chart of an embodiment of a payment method in accordance with the third aspect of the present disclosure.

The third aspect of the present disclosure provides a payment method that is applied to the network-wide payment platform, that is, a payment method can be executed by the network-wide payment platform. The specific content of the network-wide payment platform can be found in the relevant descriptions in the above embodiments, which will not be repeated here. FIG. 7 is a flow chart of an embodiment of a payment method in accordance with the third aspect of the present disclosure. As shown in FIG. 7, the payment method may include Step S401 and Step S402.

In Step S401, when an e-commerce application program of a user terminal triggers a payment, a first host program list is provided to a first SDK integrated with the e-commerce application program in a user terminal.

The first host program list includes host program identifiers of at least part of host programs supported by the network-wide payment platform, and is used to enable the user terminal to call the first SDK to determine and call up a target host program.

In some embodiments, the network-wide payment platform can receive a first payment request message sent by a user terminal through an e-commerce application program. The first payment request message includes a user identifier. Based on the historical payment data corresponding to the user identifier and/or a pre-stored payment priority strategy, the priority order of host programs supported by the network-wide payment platform may be obtained. A first host program list is generated based on the host program identifiers of the top N host programs from high to low priority, where N is a positive integer. A first payment feedback message is sent to the e-commerce application program of the user terminal. The first payment feedback message includes the first host program list.

In some embodiments, a second host program list includes host program identifiers of host programs owned by the user terminal. The target host program is a host program corresponding to the host program identifier specified by the user in the intersection of the first host program list and the second host program list.

In some embodiments, the second host program list includes host program identifiers of host programs owned by the user terminal. The target host program is a host program with the highest priority corresponding to a host program identifier in the intersection of the first host program list and the second host program list.

In Step S402, the network-wide payment platform interacts with the second SDK called by the user terminal and the host program platform through the target host program to complete payment with the target card.

The target card is a resource card bound to the target host program.

For the specific content of Step S401 and Step S402, refer to the relevant descriptions in the above embodiments, which will not be repeated here.

In the embodiments of the present disclosure, the user terminal includes an e-commerce application program, a first SDK integrated with the e-commerce application program, a host program, and a second SDK integrated with the host program. During the payment process, the network-wide payment platform can interact with the first SDK and provide the first SDK with a list including host program identifiers of at least part of host programs supported by the network-wide payment platform, so that the first SDK determines a target host program. Under such a circumstance, the user terminal can call up the target host program. The network-wide payment platform can interact with the second SDK integrated with the target host program itself, and can also interact with the host program platform of the target host program, allowing the host program platform to perform a resource deduction on the target card bound to the target host program to complete the payment. The network-wide payment platform can interact with e-commerce application programs in user terminals and SDKs integrated with different host programs. The network-wide payment platform can also interact with the host program backends corresponding to different applications, allowing the unified payment technical specifications between different card issuers and other institutions during the payment process, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

In some embodiments, before Step S401, the network-wide payment platform can also interact with the user terminal to provide order information corresponding to a payment to facilitate subsequent payment initiation. The network-wide payment platform responds to an order request of the e-commerce application program and provides order information to the e-commerce application program. The network-wide payment platform can also interact with the user terminal to provide the order information. For the specific content, refer to the relevant descriptions in the above embodiments, which will not be repeated here.

Figure 8:
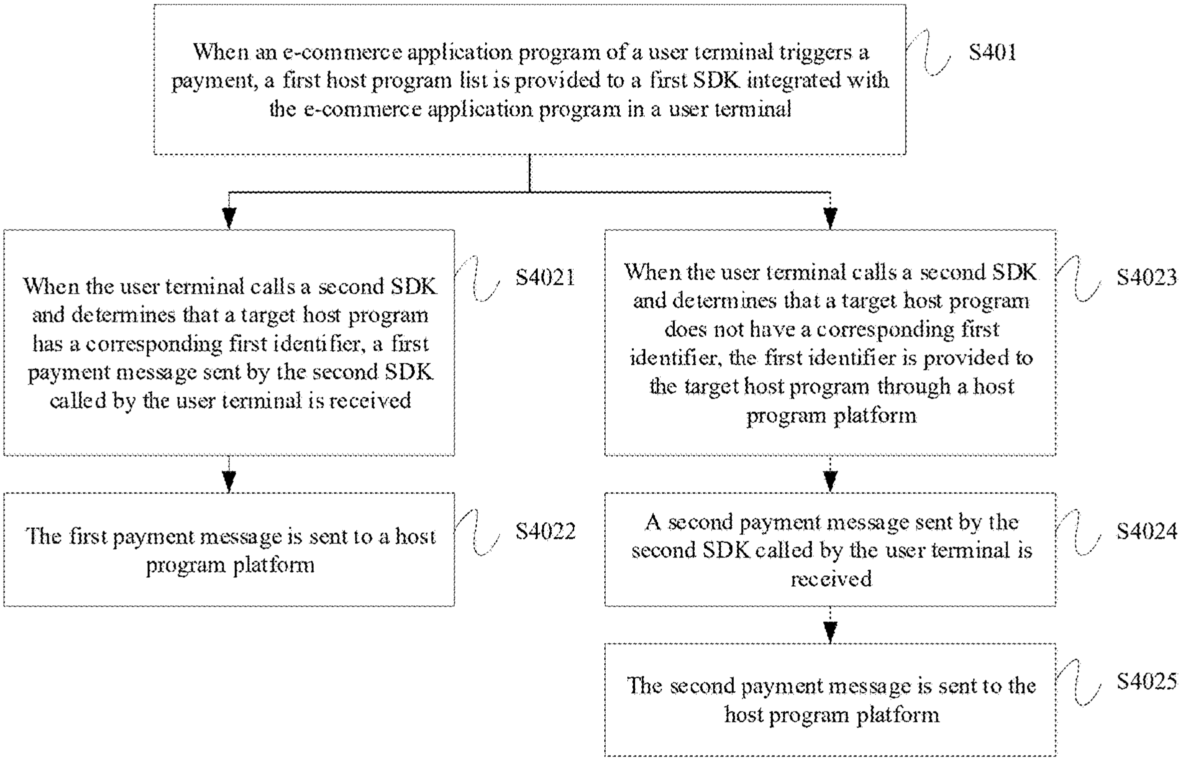
FIG. 8 is a flow chart of another embodiment of a payment method in accordance with the third aspect of the present disclosure.

In some embodiments, a first identifier can be assigned to a host program that has the function of making payments using the network-wide payment platform, so that during the payment process, it can be determined whether the current payment can be made using the payment method in the embodiments of the present disclosure. FIG. 8 is a flow chart of another embodiment of a payment method in accordance with the third aspect of the present disclosure. The difference between FIG. 8 and FIG. 7 is that Step S402 in FIG. 7 can be specifically refined into Steps S4021 to S4025 in FIG. 8.

In Step S4021, when the user terminal calls the second SDK and determines that the target host program has a corresponding first identifier, a first payment message sent by the second SDK called by the user terminal is received.

The first identifier is used to indicate that the user account in the host program has the function of making payments using the network-wide payment platform.

In Step S4022, the first payment message is sent to the host program platform.

The first payment message instructs the host program platform to perform a resource deduction of the target card and complete the payment using the target card. The first payment message includes the host program identifier of the target host program and the first identifier corresponding to the target host program.

In Step S4023, when the user terminal calls the second SDK and determines that the target host program does not have a corresponding first identifier, the first identifier is provided to the target host program through the host program platform.

In some embodiments, when logging in to the target host program, the network-wide payment platform receives a second identifier request message sent by the host program platform. Based on the user identity information, the host program identifier and the pre-stored activated user identity information, a first identifier is assigned to the target host program. A second identifier feedback message is sent to the host program platform, so that the host program platform sends a first identifier feedback message to the target host program according to the second identifier feedback message.

The second identifier request message includes user identity information and a host program identifier. The second identifier request message is generated according to the first identifier request message sent by the terminal device by calling the target host program. The first identifier request message includes user identity information. The first identifier feedback message and the second identifier feedback message include the first identifier.

In some embodiments, the user identity information includes a first user unique identifier and a first phone number. The activated user identity information includes a second user unique identifier and a second phone number.

In the case where the activated user identity information includes the unique identifier of the target second user, the network-wide payment platform binds a first user account and a second user account and generates the first identifier.

The target second user unique identifier is a second user unique identifier that is consistent with the first user unique identifier. The first user account is a user account corresponding to the first user unique identifier in the target host program. The second user account is a user account corresponding to the target second user unique identifier and the target second phone number in the network-wide payment platform. The target second phone number is a second phone number that is consistent with the first phone number.

In the case where the identity information of the activated user does not include the unique identifier of the target second user, the network-wide payment platform can create a new third user account, bind the first user account and the third user account, and generate the first identifier.

The third user account is a user account corresponding to the first user unique identifier in the network-wide payment platform.

In Step S4024, a second payment message sent by the second SDK called by the user terminal is received.

In Step S4025, the second payment message is sent to the host program platform.

The second payment message instructs the host program platform to perform a resource deduction of the target card and complete the payment using the target card. The second payment message includes the host program identifier of the target host program and a first identifier corresponding to the target host program.

Before the above Steps S4022 and S4025, the version of the second SDK, the login status of the second SDK, and/or the security of the user account in the target host program and the resource transfer-in account, etc., may be detected.

In an embodiment where the version of the second SDK needs to be detected, the network-wide payment platform can receive a version determination message sent by the second SDK of the target host program called by the user terminal, and determine whether the version of the second SDK is an available version based on the version determination message. A version feedback message is sent to the second SDK of the target host program. The version feedback message indicates whether the version of the second SDK is an available version. For the specific content of detecting the version of the second SDK, refer to the relevant descriptions in the above embodiments, which will not be repeated here.

In an embodiment where the login status of the second SDK needs to be detected, the network-wide payment platform can receive an SDK login determination message sent by the second SDK of the target host program called by the user terminal. Whether the second SDK is logged in is determined based on the SDK login determination message. An SDK login feedback message is sent to the second SDK of the target host program. The SDK login feedback message indicates whether the second SDK is logged in. For the specific content of detecting the login status of the second SDK, refer to the relevant descriptions in the above embodiments, which will not be repeated here.

In an embodiment where it is necessary to detect the security of the user account in the target host program and the resource transfer-in account, the network-wide payment platform can receive a security determination message sent by the second SDK of the target host program called by the user terminal. According to the security determination message, it is determined whether the user account in the target host program and resource transfer-in account for this payment are safe. A security feedback message is sent to the second SDK of the target host program. The security feedback message indicates whether the user account in the target host program and the resource transfer-in account are safe. For details on detecting the security of the user account in the target host program and the resource transfer-in account, refer to the relevant descriptions in the above embodiments, which will not be repeated here.

Figure 9:
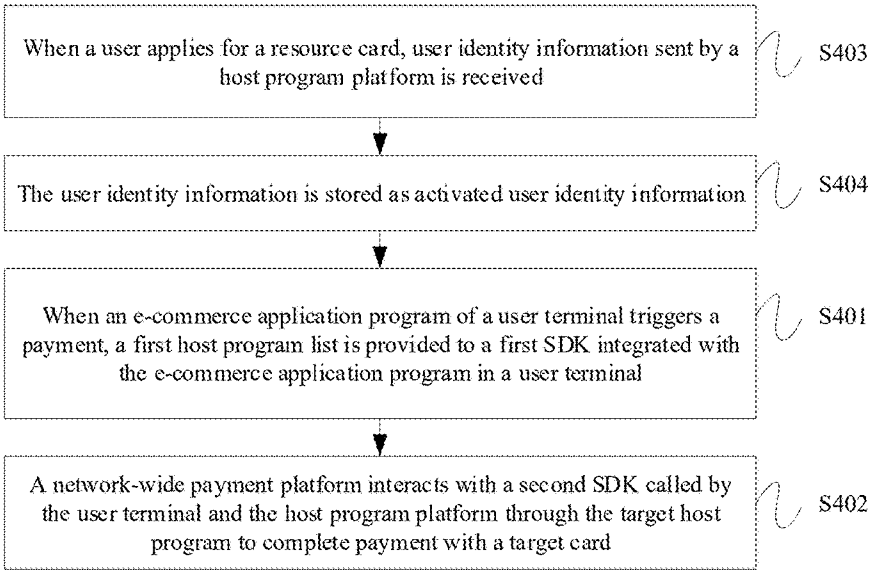
FIG. 9 is a flow chart of another embodiment of a payment method in accordance with the third aspect of the present disclosure.

In some embodiments, in order to simplify the process for a user to activate the payment function using the network-wide payment platform, a user can directly activate the payment function using the network-wide payment platform when the user opens a card at the issuing bank or through the user terminal. FIG. 9 is a flow chart of another embodiment of a payment method in accordance with the third aspect of the present disclosure. The difference between FIG. 9 and FIG. 7 is that the payment method shown in FIG. 9 may also include Step S403 and Step S404.

In Step S403, when the user applies for a resource card, the user identity information sent by the host program platform is received.

In Step S404, the user identity information is stored as activated user identity information.

For the specific content of Step S403 and Step S404, refer to the relevant descriptions in the above embodiments, which will not be repeated here.

In some embodiments, the user terminal can also make a payment based on a payment code. The network-wide payment platform can respond to a payment code request from the second SDK called by the user terminal and issue a payment code to the second SDK. The network-wide payment platform receives a payment request initiated by the payment acceptance terminal by scanning the payment code, and interacts with the host program platform to complete the payment according to the payment request. The specific content of payment by the user terminal according to the payment code can be found in the relevant descriptions in the above embodiments, which will not be repeated here.

In some embodiments, the user terminal can also make a payment based on a collection code. The network-wide payment platform can receive a payment request initiated by the second SDK called by the user terminal to scan the collection code, and interact with the host program platform to complete a payment indicated by the payment request. The specific content of payment by the user terminal according to the collection code can be found in the relevant descriptions in the above embodiments, which will not be repeated here.

Figure 10:
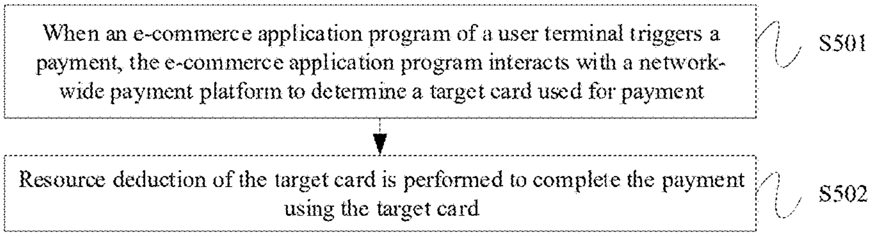
FIG. 10 is a flow chart of an embodiment of a payment method in accordance with the fourth aspect of the present disclosure.

The fourth aspect of the present disclosure also provides a payment method, which is applied to the host program platform, that is, the payment method can be executed by the host program platform. For the specific content of the host program platform, refer to the relevant descriptions in the above embodiments, which will not be repeated here. FIG. 10 is a flow chart of an embodiment of a payment method in accordance with the fourth aspect of the present disclosure. As shown in FIG. 10, the payment method may include Step S501 and Step S502.

In Step S501, when an e-commerce application program of a user terminal triggers a payment, the e-commerce application program interacts with the network-wide payment platform to determine a target card used for payment.

The target card is a resource card bound to the target host program. The target card is determined based on the interaction between the second SDK of the target host program called by the user terminal and the network-wide payment platform. The target host program is a host program determined from the first host program list by the first SDK called by the user terminal. The first host program list includes host program identifiers of at least part of host programs supported by the network-wide payment platform.

In some embodiments, the first host program list includes host program identifiers of N host programs arranged from high to low priority, where N is an integer. The priority is determined based on the historical payment data corresponding to the user identifier provided by the user terminal through the e-commerce application program and/or a pre-stored payment priority policy.

In some embodiments, a second host program list includes host program identifiers of host programs owned by the user terminal. The target host program is a host program corresponding to a host program identifier specified by the user in the intersection of the first host program list and the second host program list.

In some embodiments, the second host program list includes host program identifiers of host programs owned by the user terminal. The target host program is a host program with the highest priority corresponding to a host program identifier in the intersection of the first host program list and the second host program list.

In Step S502, a resource deduction of the target card is performed to complete the payment using the target card.

For the specific content of the above Step S501 and Step S502, refer to the relevant descriptions in the above embodiments, which will not be repeated here.

In the embodiments of the present disclosure, the user terminal includes an e-commerce application program, a first SDK integrated with the e-commerce application program, a host program, and a second SDK integrated with the host program. During the payment process, the network-wide payment platform can interact with the first SDK and provide the first SDK with a list including host program identifiers of at least part of host programs supported by the network-wide payment platform, so that the first SDK determines a target host program. Under such a circumstance, the user terminal can call up the target host program. The network-wide payment platform can interact with the second SDK integrated with the target host program itself, and can also interact with the host program platform of the target host program, allowing the host program platform to perform a resource deduction on the target card bound to the target host program to complete the payment. The network-wide payment platform can interact with e-commerce application programs in user terminals and SDKs integrated with different host programs. The network-wide payment platform can also interact with the host program backends corresponding to different applications, allowing the unified payment technical specifications between different card issuers and other institutions during the payment process, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

Figure 11:
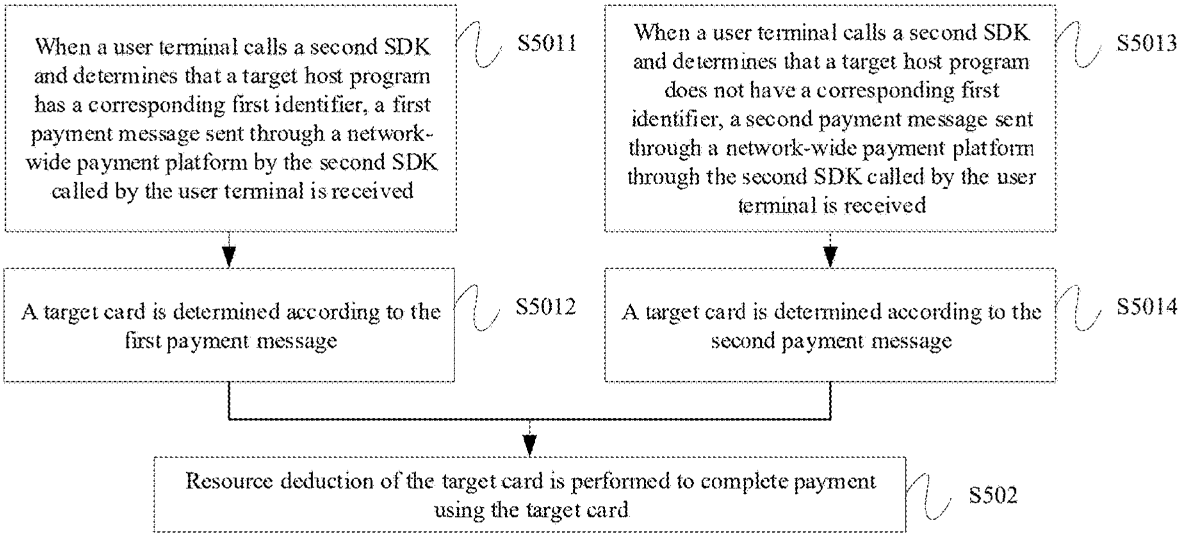
FIG. 11 is a flow chart of another embodiment of a payment method in accordance with the fourth aspect of the present disclosure.

In some embodiments, a first identifier can be assigned to a host program that has the function of making payments using the network-wide payment platform, so that during the payment process, it can be determined whether the current payment can be made using the payment method in the embodiments of the present disclosure. FIG. 11 is a flow chart of another embodiment of a payment method in accordance with the fourth aspect of the present disclosure. The difference between FIG. 11 and FIG. 10 is that Step S501 in FIG. 10 can be specifically refined into Steps S5011 to Step S5014 in FIG. 11.

In Step S5011, when the user terminal calls the second SDK and determines that the target host program has a corresponding first identifier, a first payment message sent through the network-wide payment platform by the second SDK called by the user terminal is received.

The first payment message includes the host program identifier of the target host program and the first identifier corresponding to the target host program.

In Step S5012, the target card is determined according to the first payment message.

In Step S5013, when the user terminal calls the second SDK and determines that the target host program does not have the corresponding first identifier, a second payment message sent through the network-wide payment platform by the second SDK called by the user terminal is received.

The second payment message includes the host program identifier of the target host program and the first identifier corresponding to the target host program assigned by the network-wide payment platform.

In some embodiments, when logging in to the target host program, the host program platform receives a first identifier request message sent by the target host program called by the user terminal, where the first identifier request message includes user identity information. In response to the first identifier request message, the host program platform sends a second identifier request message to the network-wide payment platform. The second identifier request message is used to request the first identifier. The second identifier request message includes the user identity information and host program identifier. The host program platform receives a second identifier feedback message sent by the network-wide payment platform, where the second identifier feedback message includes the first identifier. The first identifier is obtained by the network-wide payment platform based on the user identity information, the host program identifier and the pre-stored user identity information. According to the second identifier feedback message, a first identifier feedback message is sent to the target host program of the user terminal, where the first identifier feedback message includes the first identifier.

In Step S5014, the target card is determined according to the second payment message.

For the specific content of the above Steps S5011 to Step S5014, refer to the relevant descriptions in the above embodiments, which will not be repeated here.

Figure 12:
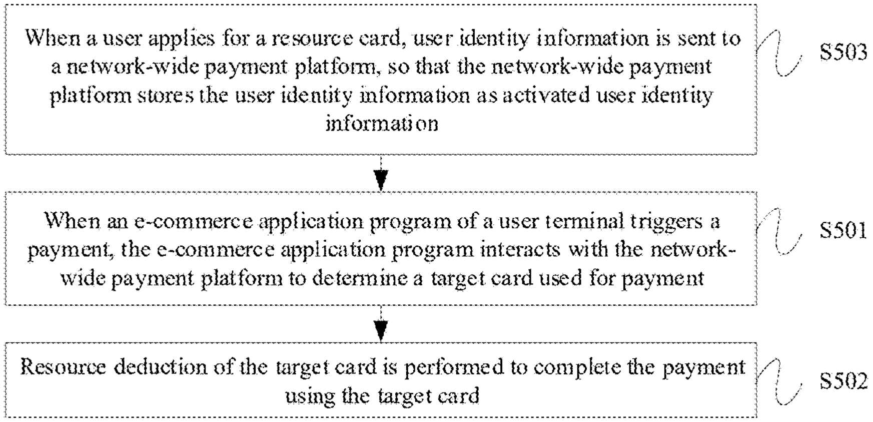
FIG. 12 is a flow chart of another embodiment of a payment method in accordance with the fourth aspect of the present disclosure.

In some embodiments, in order to simplify the process for a user to activate the payment function using the network-wide payment platform, a user can directly activate the payment function using the network-wide payment platform when the user opens a card at the issuing bank or through the user terminal. FIG. 12 is a flow chart of yet another embodiment of a payment method in accordance with the fourth aspect of the present disclosure. The difference between FIG. 12 and FIG. 10 is that the payment method shown in FIG. 12 may also include Step S503.

In Step S503, when a user applies for a resource card, user identity information is sent to the network-wide payment platform, so that the network-wide payment platform stores the user identity information as activated user identity information.

For the specific content of Step S503, refer to the relevant descriptions in the above embodiments, which will not be repeated here.

In order to facilitate understanding, the following uses a first identifier application process in the payment system, an e-commerce application program triggering a payment process, a payment code-scanning payment process and a collection code-scanning payment process as examples to illustrate some processes of the payment methods in the embodiments of the present disclosure.

Figure 13:
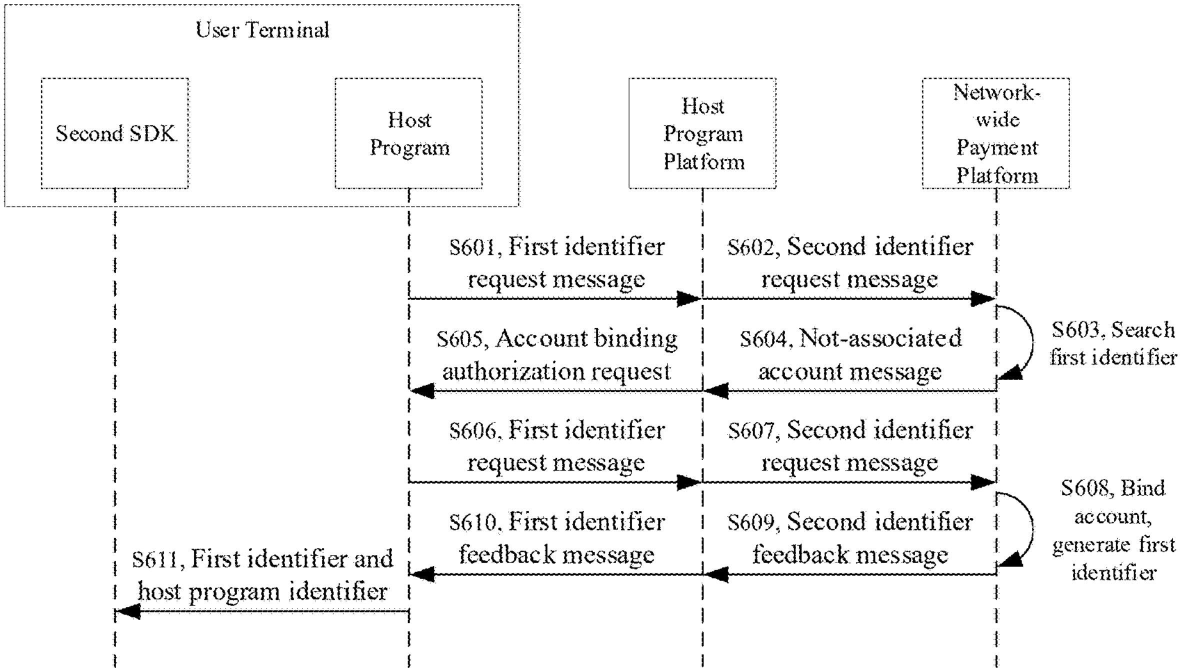
FIG. 13 is a flow chart of an example of a first identifier application process in accordance with an embodiment of the present disclosure.

FIG. 13 is a flow chart of an example of a first identifier application process in accordance with an embodiment of the present disclosure. As shown in FIG. 13, the application process for the first identifier involves a host program in the terminal device, the second SDK, the host program platform and the network-wide payment platform. The application process for the first identifier may include Steps S601 to S611.

In Step S601, the host program sends a first identifier request message to the host program platform.

In Step S602, the host program platform sends a second identifier request message to the network-wide payment platform.

In Step S603, the network-wide payment platform checks whether a user account in a host program has the first identifier based on the user identity information and the host program identifier in the second identifier request message, that is, whether there is a user account, in the network-wide payment platform, that is associated with the user account in the host program. If the user account in the host program does not have the first identifier, jump to Step S604. If the user account in the host program has the first identifier, jump to Step S609.

In Step S604, the network-wide payment platform sends a not-associated account message to the host program platform to notify the host program platform that the network-wide payment platform does not have a user account, of the network-wide payment platform, that is associated with the user account in the host program.

In Step S605, the host program platform sends an account binding authorization request to the host program, requesting the user to authorize the binding of the user account in the host program with a user account of the network-wide payment platform.

In Step S606, in response to the user's authorization input, the host program sends the first identifier request message to the host program platform again.

The user's authorization input enters the user identity information. Here, the user identity information in the first identifier request message is the user identity information that is authorized to be input.

In Step S607, the host program platform sends a second identifier request message to the network-wide payment platform.

The second identifier request message includes the user identity information, host program identifier and user account of the user in the target host program.

In Step S608, the network-wide payment platform performs account binding based on the second identifier request message and the activated user identity information, that is, binds the user account in the host program with a user account of the network-wide payment platform, and generates the first identifier.

In Step S609, the network-wide payment platform sends a second identifier feedback message to the host program platform.

The second identifier feedback message includes the first identifier.

In Step S610, the host program platform sends a first identifier feedback message to the host program.

The first identifier feedback message includes the first identifier.

In Step S611, the host program sends the first identifier and the host program identifier to the second SDK.

For the specific content of the above Steps S601 to Step S611, refer to the relevant descriptions in the above embodiments, which will not be repeated here.

Figure 14:
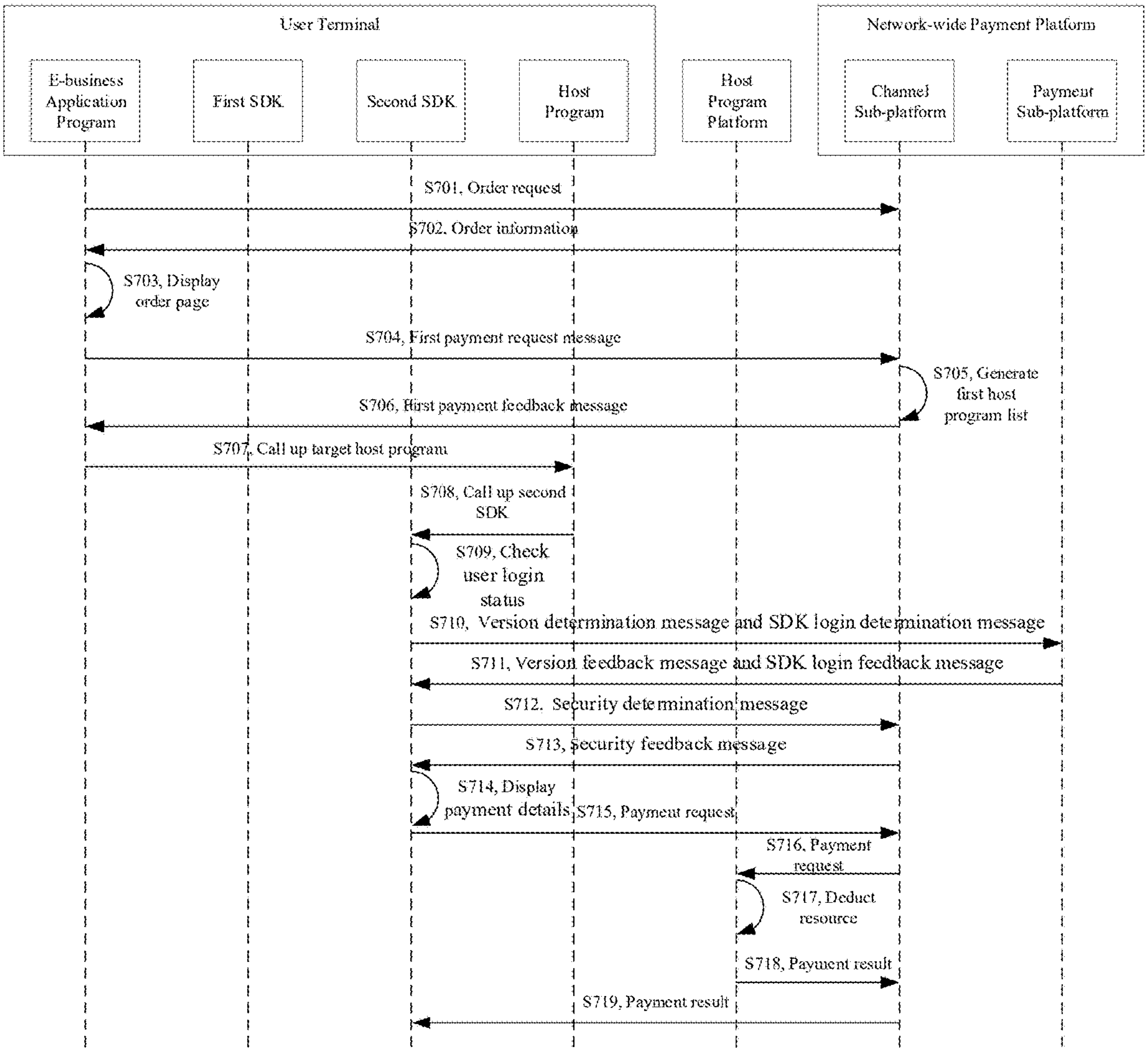
FIG. 14 is a flow chart of an example of a payment process triggered by an e-commerce application program in accordance with an embodiment of the present disclosure.

FIG. 14 is a flow chart of an example of a payment process triggered by an e-commerce application program in accordance with an embodiment of the present disclosure. As shown in FIG. 14, an e-commerce application program triggering a payment process may involve the e-commerce application program in the user terminal, the first SDK, a host program, the second SDK, the host program platform and the network-wide payment platform. The host program refers to the target host program, and correspondingly, the host program platform refers to the host program platform of the target host program. The network-wide payment platform may include a channel sub-platform and a payment sub-platform. The channel sub-platform is mainly used to manage the relevant information of each host program and host program platform supported by the network-wide payment platform, and the payment sub-platform is used to manage the relevant information of each SDK. A payment process triggered by the e-commerce application program may include Steps S701 to S719.

In Step S701, in response to a second user input to the e-commerce application program in the user terminal, the user terminal sends an order request to the channel sub-platform through the e-commerce application program.

In Step S702, the channel sub-platform generates order information in response to the order request, and feeds back the order information to the e-commerce application program in the user terminal.

In Step S703, the e-commerce application program is called in the user terminal to display an order page, where the order page includes the order information.

In Step S704, the e-commerce application program is called in the user terminal to trigger a payment, and a first payment request message is sent to the channel sub-platform.

In Step S705, the channel sub-platform generates a first host program list in response to the first payment request information.

In Step S706, the channel sub-platform feeds back a first payment feedback message to the e-commerce application program. The first payment feedback message includes the first host program list.

In Step S707, the e-commerce application program calls the first SDK to determine a target host program based on the first host program list, and calls up the target host program.

In Step S708, the target host program calls up the second SDK of the target host program.

In Step S709, the user terminal calls the second SDK to check the user login status.

In Step S710, the user terminal calls the second SDK to send a version determination message and an SDK login determination message to the payment sub-platform.

In Step S711, the payment sub-platform determines whether the version of the second SDK is an available version and whether the second SDK is logged in based on the version determination message and the SDK login determination message, and feeds back a version feedback message and an SDK login feedback message to the second SDK.

In Step S712, the user terminal calls the second SDK to send a security determination message to the channel sub-platform.

In Step S713, the channel sub-platform determines whether the user account in the target host program and the resource transfer-in account for this payment are safe based on the security determination message, and feeds back a security feedback message to the second SDK.

In Step S714, the user terminal calls the second SDK to display payment details and request verification from the user.

In Step S715, after the user verification is successful, the second SDK sends a payment request to the channel sub-platform.

In Step S716, the channel sub-platform sends a payment request to the host program platform.

In Step S717, the host program platform deducts a resource from the user's target card according to the payment request.

In Step S718, the host program platform feeds back a payment result to the channel sub-platform.

In Step S719, the channel sub-platform sends the payment result to the second SDK.

For the specific content of the above Steps S701 to Step S719, refer to the relevant descriptions in the above embodiments, which will not be repeated here.

Payment code-scanning payments can be divided into an application program front-load mode of payment code-scanning payments and a resource card front-load mode of payment code-scanning payments. The following are examples of payment code-scanning payments in these two modes.

Figure 15:
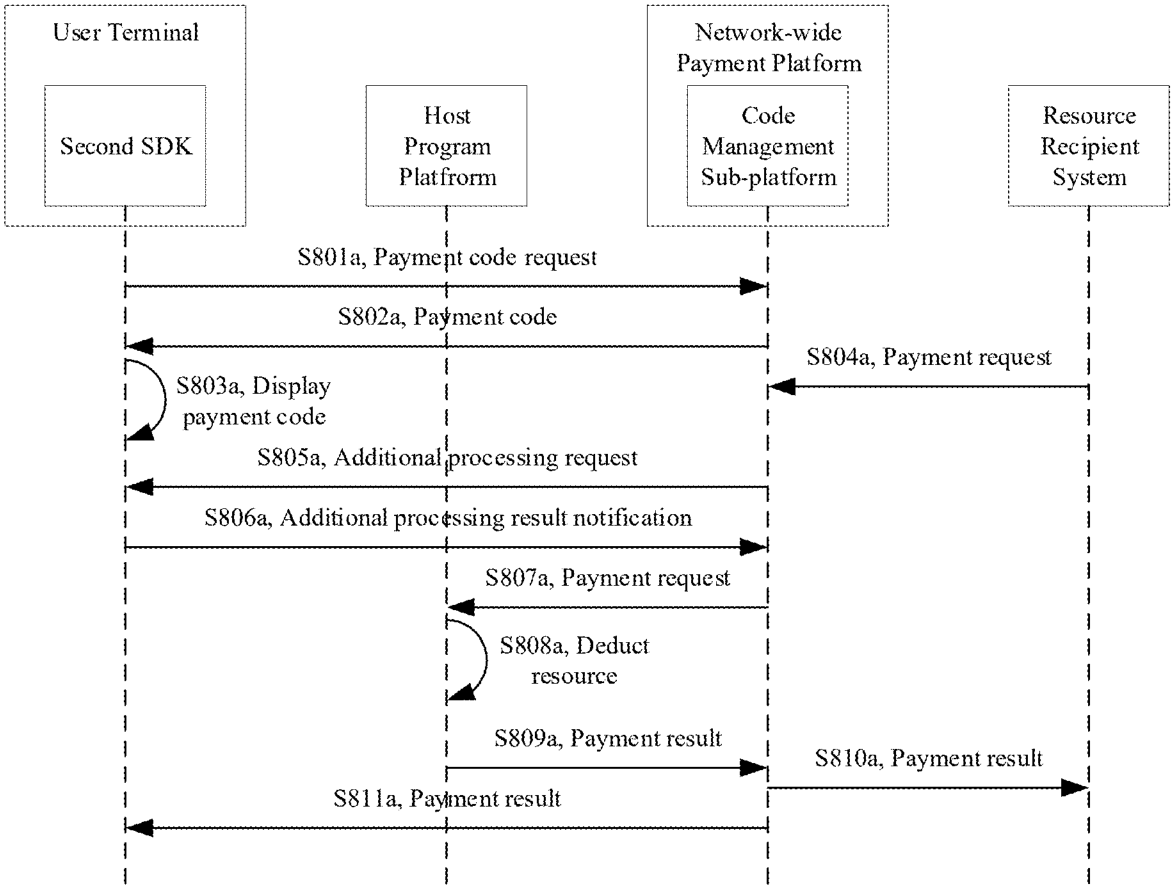
FIG. 15 is a flow chart of an example of a payment code-scanning payment process in an application program front-load mode in accordance with an embodiment of the present disclosure.

FIG. 15 is a flow chart of an example of the payment code-scanning payment process in the application program front-load mode in accordance with an embodiment of the present disclosure. As shown in FIG. 15, a payment code-scanning payment process involves the second SDK of the host program in the user terminal, the network-wide payment platform, the host program platform and a resource recipient system. The network-wide payment platform may include a code management sub-platform, which is responsible for the management of payment codes and the management of additional information of the network-wide payment platform. The resource recipient system is a system to which the resources in the payment are transferred to the accounts, and may include a payment acceptance terminal equipment or other equipment. The payment code-scanning payment process in the application program front-load mode may include Steps S801*a* to S811*a*.

In Step S801*a*, the user terminal calls the second SDK of the host program to send a payment code request to the code management sub-platform.

In Step S802*a*, the code management sub-platform responds to the payment code request, generates a payment identifier, that is, a payment token, converts the payment token into a payment code, and issues the payment code to the second SDK.

In Step S803*a*, the user terminal calls the second SDK to display the payment code.

In Step S804*a*, the resource recipient system scans the payment code and sends a payment request to the code management sub-platform.

In Step S805*a*, the code management sub-platform sends an additional processing request to the second SDK.

The additional processing request may include additional payment-related information. Additional information may include promotional information, event information, etc.

In Step S806*a*, the user terminal calls the second SDK to send an additional processing result notification to the code management sub-platform.

The additional processing result notification includes information indicating a situation in which the user selected additional information.

In Step S807*a*, the code management sub-platform sends a payment request to the host program platform.

In Step S808*a*, the host program platform deducts a resource from the user's target card according to the payment request.

In Step S809*a*, the host program platform feeds back a payment result to the code management sub-platform.

In Step S810*a*, the code management sub-platform sends the payment result to the resource recipient system.

In Step S811*a*, the code management sub-platform sends the payment result to the second SDK.

For the specific content of the above Steps S801*a* to Step S811*a*, refer to the relevant descriptions in the above embodiments, which will not be repeated here.

Figure 16:
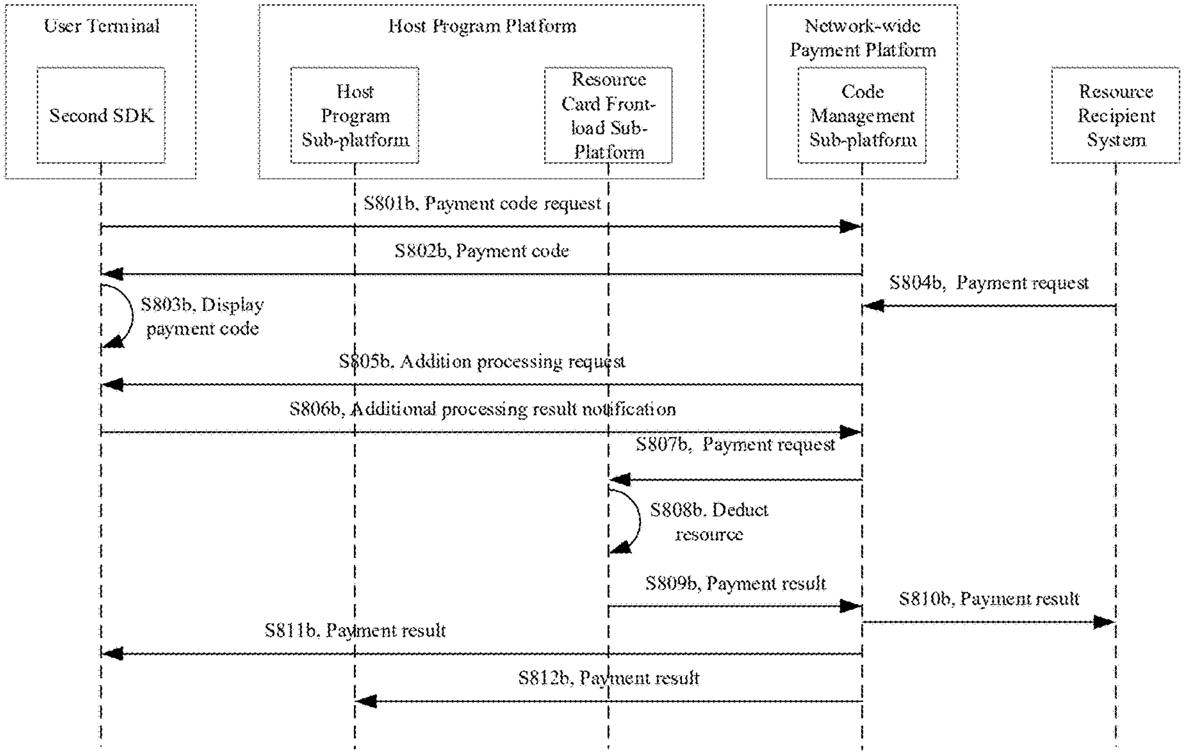
FIG. 16 is a flow chart of an example of a payment code-scanning payment process in a resource card front-load mode in accordance with an embodiment of the present disclosure.

FIG. 16 is a flow chart of an example of the payment code-scanning payment process in the resource card front-load mode in accordance with an embodiment of the present disclosure. As shown in FIG. 16, the payment code-scanning payment process involves the second SDK of the host program in the user terminal, the network-wide payment platform, the host program platform and the resource recipient system. The network-wide payment platform may include a code management sub-platform, which is responsible for the management of payment codes and the management of additional information of the network-wide payment platform. The host program platform includes a host program sub-platform and a resource card front-load sub-platform. The host program sub-platform is responsible for interacting with the host program, and the resource card front-load sub-platform is responsible for deducting and transferring resources in the card. The resource recipient system is a system to which the resources in the payment are transferred to the accounts, and may include payment acceptance terminal equipment or other equipment. The payment code-scanning payment process in the resource card front-load mode may include Steps S801*b* to S812*b*.

In Step S801*b*, the user terminal calls the second SDK of the host program to send a payment code request to the code management sub-platform.

In Step S802*b*, the code management sub-platform responds to the payment code request, generates a payment identifier, that is, a payment token, converts the payment token into a payment code, and issues the payment code to the second SDK.

In Step S803*b*, the user terminal calls the second SDK to display the payment code.

In Step S804*b*, the resource recipient system scans the payment code and sends a payment request to the code management sub-platform.

In Step S805*b*, the code management sub-platform sends an additional processing request to the second SDK.

Additional processing requests may include additional payment-related information. Additional information can include promotion information, event information, etc.

In Step S806*b*, the user terminal calls the second SDK to send an additional processing result notification to the code management sub-platform.

The additional processing result notification includes information indicating a situation in which the user selected additional information.

In Step S807*b*, the code management sub-platform sends a payment request to the resource card front-load sub-platform.

In Step S808*b*, the resource card front-load sub-platform deducts a resource from the user's target card according to the payment request.

In Step S809*b*, the resource card front-load sub-platform feeds back the payment result to the code management sub-platform.

In Step S810*b*, the code management sub-platform sends the payment result to the resource recipient system.

In Step S811*b*, the code management sub-platform sends the payment result to the second SDK.

In Step S812*b*, the code management sub-platform sends the payment result to the host program sub-platform.

For the specific content of the above Steps S801*b* to Step S812*b*, refer to the relevant descriptions in the above embodiments, which will not be repeated here.

Collection code-scanning payments can be divided into an application program front-load mode of collection code-scanning payments and a resource card front-load mode of collection code-scanning payments. Below are examples of collection code-scanning payments for these two modes.

Figure 17:
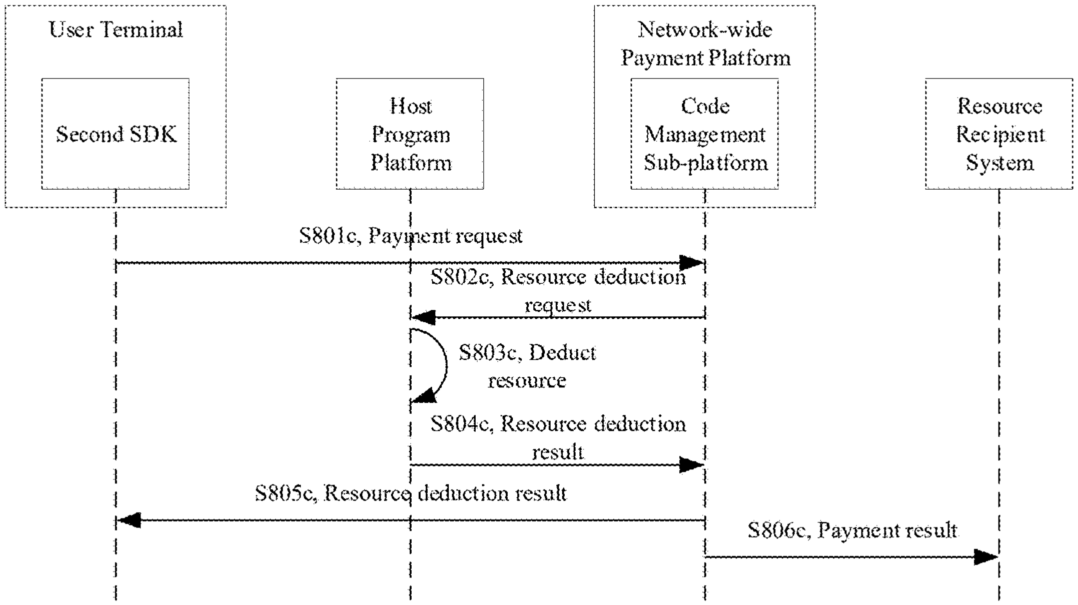
FIG. 17 is a flow chart of an example of a collection code-scanning payment process in an application program front-load mode in accordance with an embodiment of the present disclosure.

FIG. 17 is a flow chart of an example of a collection code-scanning payment process in the application program front-load mode in accordance with an embodiment of the present disclosure. As shown in FIG. 17, the collection code-scanning payment process involves the second SDK of the host program in the user terminal, the network-wide payment platform, the host program platform and the resource recipient system. The network-wide payment platform may include a code management sub-platform, which is responsible for the management of collection codes. The resource recipient system is a system to which the resources in the payment are transferred to the accounts. The collection code-scanning payment process in the application program front-load mode may include Steps S801*c* to S806*c*.

In Step S801*c*, the user terminal calls the second SDK of the host program to scan a collection code and sends a payment request to the code management sub-platform.

In Step S802*c*, the code management sub-platform responds to the payment request and sends a resource deduction request to the host program platform. The resource deduction request may include resource deduction information, resource deduction amount, resource transfer-in account owner code, resource transfer-in account owner category, resource transfer-in account owner name, additional information, etc. Additional information can include promotion information, event information, etc.

In Step S803*c*, the host program platform deducts a resource from the user's target card in response to the resource deduction request.

In Step S804*c*, the host program platform sends a resource deduction result to the code management sub-platform.

The resource deduction result indicates a successful deduction or failed deduction.

In Step S805*c*, the code management sub-platform sends the resource deduction result to the second SDK.

In Step S806*c*, the code management sub-platform sends the payment result to the resource recipient system.

The payment result may include resource deductor information, resource deduction amount, resource transfer-in account owner code, resource transfer-in account owner category, resource transfer-in account owner name, additional information, etc.

For the specific content of the above Steps S801*c* to Step S806*c*, refer to the relevant descriptions in the above embodiments, which will not be repeated here.

Figure 18:
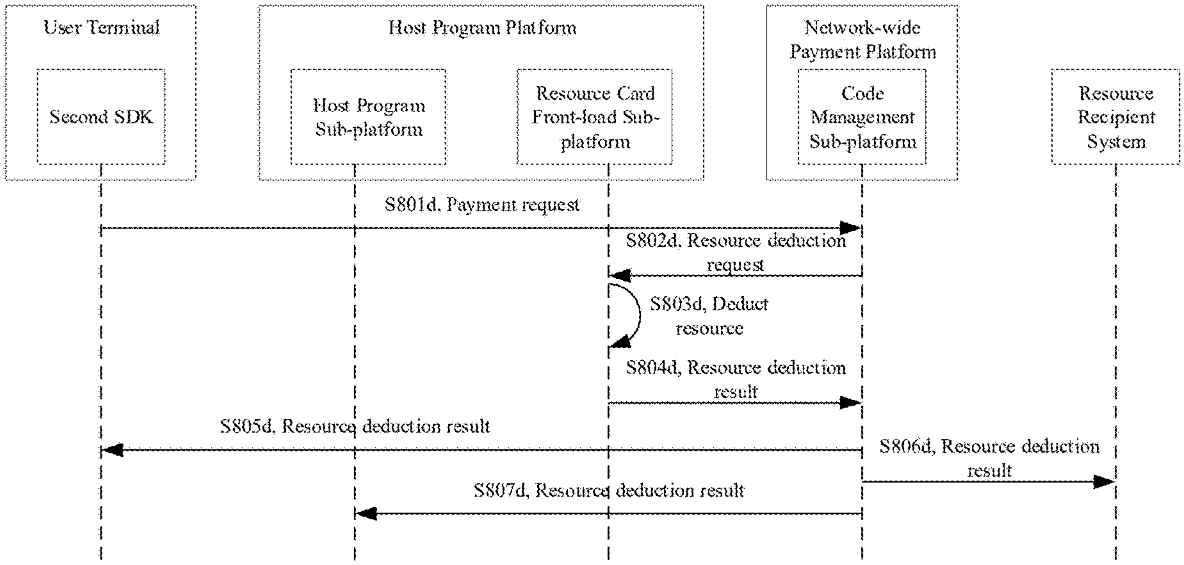
FIG. 18 is a flow chart of an example of a collection code-scanning payment process in a resource card front-load mode in accordance with an embodiment of the present disclosure.

FIG. 18 is a flow chart of an example of a collection code-scanning payment process in the resource card front-load mode in accordance with an embodiment of the present disclosure. As shown in FIG. 18, the collection code-scanning payment process involves the second SDK of the host program in the user terminal, the network-wide payment platform, the host program platform and the resource recipient system. The network-wide payment platform may include a code management sub-platform, which is responsible for the management of payment codes. The host program platform includes a host program sub-platform and a resource card front-load sub-platform. The host program sub-platform is responsible for interacting with the host program, and the resource card front-load sub-platform is responsible for deducting and transferring resources in a card. The resource recipient system is a system to which the resources in the payment are transferred to the accounts. The collection code-scanning payment process in the resource card front-load mode may include Steps S801*d* to S807*d*.

In Step S801*d*, the user terminal calls the second SDK of the host program to scan a collection code and sends a payment request to the code management sub-platform.

In Step S802*d*, the code management sub-platform responds to the payment request and sends a resource deduction request to the resource card front-load sub-platform.

In Step S803*d*, the resource card front-load sub-platform responds to the resource deduction request and deducts a resource from the user's target card.

In Step S804*d*, the resource card front-load sub-platform sends the resource deduction result to the code management sub-platform.

In Step S805*d*, the code management sub-platform sends the resource deduction result to the second SDK.

In Step S806*d*, the code management sub-platform sends the resource deduction result to the resource recipient system.

In Step S807*d*, the code management sub-platform sends the resource deduction result to the host program sub-platform.

For the specific content of the above Steps S801*d* to Step S807*d*, refer to the relevant descriptions in the above embodiments, which will not be repeated here.

Figure 19:
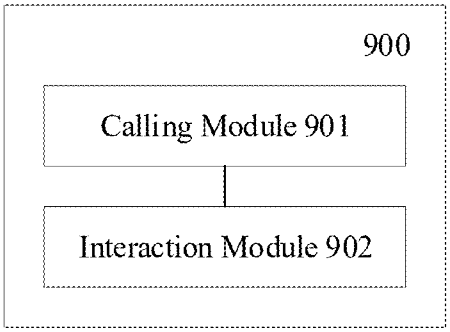
FIG. 19 is a schematic structural diagram of an embodiment of a user terminal in accordance with the fifth aspect of the present disclosure.

A fifth aspect of the present disclosure provides a user terminal, which has an e-commerce application program, a first SDK integrated with the e-commerce application program, a host program, and a second SDK integrated with the host program. FIG. 19 is a schematic structural diagram of an embodiment of a user terminal in accordance with the fifth aspect of the present disclosure. As shown in FIG. 19, the user terminal 900 includes a calling module 901 and an interaction module 902.

The calling module 901 can be configured to call the first SDK and use the interaction module 902 to obtain the first host program list from the network-wide payment platform when the e-commerce application program triggers a payment, and is also configured to call up a target host program when the first SDK is called to determine the target host program in the first hot program list.

The first host program list includes host program identifiers of at least part of host programs supported by the network-wide payment platform.

The calling module 901 can also be configured to call the second SDK through the target host program to interact with the network-wide payment platform using the interaction module 902, so that the network-wide payment platform interacts with the host program platform to complete the payment using a target card.

The target card is a resource card bound to the target host program.

In the embodiments of the present disclosure, the user terminal includes an e-commerce application program, a first SDK integrated with the e-commerce application program, a host program, and a second SDK integrated with the host program. During the payment process, the first SDK can interact with the network-wide payment platform to obtain a list including host program identifiers of at least part of host programs supported by the network-wide payment platform, so that when the first SDK determines the target host program, the user terminal can call up the target host program. The target host program can call the second SDK integrated by itself. The second SDK can interact with the network-wide payment platform. The network-wide payment platform can interact with the host program platform of the target host program to execute a resource deduction of the target card bound to the target host program, to complete the payment. E-commerce applications and different host programs in user terminals can interact with the network-wide payment platform through their respective integrated SDKs, so that the network-wide payment platform can interact with the host program backends corresponding to different applications. This makes unified payment technical specifications among different card issuers and other institutions in the payment processes, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

In some embodiments, the interaction module 902 may include a transmitting unit and a receiving unit.

The calling module 901 can be configured to use the transmitting unit to send the first payment request message to the network-wide payment platform through the e-commerce application program.

The first payment request message includes a user identifier and is used to instruct the network-wide payment platform to generate a first host program list based on historical payment data corresponding to the user identifier and/or a pre-stored payment priority policy. The first host program list includes host program identifiers of N host programs arranged from high to low priority, where N is a positive integer.

The receiving unit may be configured to receive the first payment feedback message sent by the network-wide payment platform.

The first payment feedback message includes the first host program list.

In some embodiments, the calling module 901 can also be configured to: call the first SDK to obtain a second host program list locally, where the second host program list includes the host program identifiers of the host programs owned by the user terminal; call the first SDK to obtain an intersection of the first host program list and the second host program list and display the intersection; and in response to a first user input, determine a host program, in the intersection, corresponding to the host program identifier specified in the first user input as the target host program.

In some embodiments, the calling module 901 can also be configured to: call the first SDK to obtain a second host program list locally, where the second host program list includes the host program identifiers of the host programs owned by the user terminal; call the first SDK to obtain an intersection of the first host program list and the second host program list; and determine a host program with the highest priority corresponding to a host program identifier in the intersection as the target host program.

In some embodiments, the calling module 901 can be configured to call the second SDK to query whether the target host program has a corresponding first identifier. The first identifier is used to indicate that a user account in a host program has the function of making payments using the network-wide payment platform.

The calling module 901 can be configured to call the second SDK to use the transmitting unit to send a first payment message to the network-wide payment platform when the target host program has a corresponding first identifier, so that the network-wide payment platform sends the first payment message to the host program platform. The host program platform performs the resource deduction of the target card and completes the payment using the target card. The first payment message includes a host program identifier of the target host program and a first identifier corresponding to the target host program.

In some embodiments, when the target host program does not have a corresponding first identifier, the calling module 901 can be configured to call the target host program to request a first identifier corresponding to the target host program from the network-wide payment platform through the host program platform using the interaction module 902.

The calling module 901 can also be configured to call the target host program to use the receiving unit to receive the first identifier corresponding to the target host program assigned by the network-wide payment platform through the host program platform.

The calling module 901 can also be configured to call the second SDK to use the transmitting unit to send a second payment message to the network-wide payment platform, so that the network-wide payment platform sends the second payment message to the host program platform. The host program platform then performs a resource deduction of the target card to complete the payment using the target card. The second payment message includes the host program identifier of the target host program and the first identifier corresponding to the target host program.

In some embodiments, the calling module 901 may be configured to call the target host program to use the transmitting unit to send the first identifier request message to the host program platform when logging in to the target host program. The first identifier request message includes user identity information and is used to instruct the host program platform to send a second identifier request message to the network-wide payment platform. The second identifier request message is used to request the first identifier. The second identifier request message includes the user identity information and host program identifier.

The calling module 901 can be configured to call the target host program to use the receiving unit to receive the first identifier feedback message sent by the host program platform. The first identifier feedback message includes the first identifier. The first identifier feedback message is generated based on a second identifier feedback message sent by the network-wide payment platform to the host program platform. The second identifier feedback message includes the first identifier. The first identifier is obtained by the network-wide payment platform based on the user identity information, host program identifier and pre-stored user identity information.

In some embodiments, the activated user identity information includes the user identity information sent by the host program platform to the network-wide payment platform when the user applies for a resource card.

In some embodiments, the calling module 901 can also be configured to call the second SDK of the target host program to use the transmitting unit to send a version determination message to the network-wide payment platform. The version determination message instructs the network-wide payment platform to determine whether the version of the second SDK is an available version.

The calling module 901 may also be configured to receive a version feedback message sent by the network-wide payment platform through the second SDK of the target host program using the receiving unit. The version feedback message indicates whether the version of the second SDK is an available version.

In some embodiments, the calling module 901 can also be configured to call the second SDK of the target host program to send an SDK login determination message to the network-wide payment platform using a transmitting unit. The SDK login determination message instructs the network-wide payment platform to determine whether the second SDK is logged in.

The calling module 901 may also be configured to receive an SDK login feedback message sent by the network-wide payment platform through the second SDK of the target host program using the receiving unit. The SDK login feedback message indicates whether the second SDK version is logged in.

In some embodiments, the calling module 901 can also be configured to call the second SDK of the target host program to send a security determination message to the network-wide payment platform using the transmitting unit. The security determination message instructs the network-wide payment platform to determine whether the user account in the target host program and resource transfer-in account for this payment are safe.

The calling module 901 can also be configured to receive a security feedback message sent by the network-wide payment platform through the second SDK of the target host program using the receiving unit. The security feedback message indicates whether the user account in the target host program and the resource transfer-in account are safe.

In some embodiments, the user terminal 900 also includes a processing module.

The calling module 901 can also be configured to respond to a second user input and use the interaction module 902 to obtain order information from the network-wide payment platform through the e-commerce application program.

The processing module may be configured to trigger a payment in response to a third user input to the order page. The order page includes order information.

In some embodiments, the calling module 901 can also be configured to call the second SDK to obtain a payment code from the network-wide payment platform through the interaction module. The payment code is used for scanning by a payment acceptance terminal to initiate a payment request to the network-wide payment platform;

In some embodiments, the calling module 901 can also be configured to call the second SDK to scan a collection code. The interaction module 902 can also be configured to initiate a payment request to the network-wide payment platform.

Figure 20:
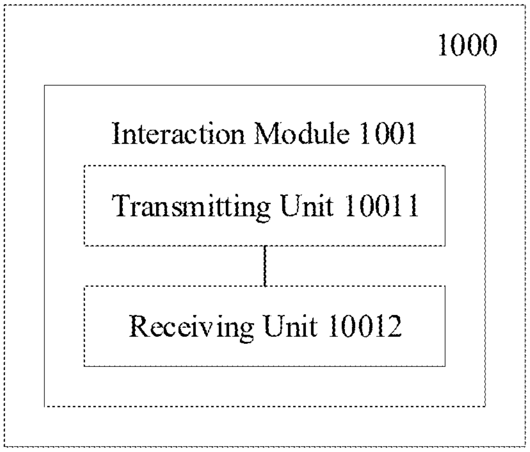
FIG. 20 is a schematic structural diagram of an embodiment of a payment management apparatus in accordance with the sixth aspect of the present disclosure.

A sixth aspect of the present disclosure provides a payment management apparatus, which is an apparatus in the network-wide payment platform in the above embodiments. FIG. 20 is a schematic structural diagram of an embodiment of a payment management apparatus in accordance with the sixth aspect of the present disclosure. As shown in FIG. 20, the payment management apparatus 1000 includes an interaction module 1001, where the interaction module 1001 may include a transmitting unit 10011. In some embodiments, the interaction module 1001 may also include a receiving unit 10012.

The transmitting unit 10011 may be configured to provide a first host program list to the first SDK integrated with an e-commerce application program in the user terminal when the e-commerce application program in the user terminal triggers a payment.

The user terminal includes an e-commerce application program, a first SDK, a host program, and a second SDK integrated with the host program. The first host program list includes host program identifiers of at least part of host programs supported by the network-wide payment platform, and is used to allow the user terminal to call the first SDK to determine and call up a target host program.

The interaction module 1001 can be configured to interact with the second SDK and host program platform called by the user terminal through the target host program to complete the payment using a target card.

The target card is a resource card bound to the target host program.

In the embodiments of the present disclosure, the user terminal includes an e-commerce application program, a first SDK integrated with the e-commerce application program, a host program, and a second SDK integrated with the host program. During the payment process, the network-wide payment platform can interact with the first SDK and provide the first SDK with a list including host program identifiers of at least part of host programs supported by the network-wide payment platform, so that the first SDK determines a target host program. Under such a circumstance, the user terminal can call up the target host program. The network-wide payment platform can interact with the second SDK integrated with the target host program itself, and can also interact with the host program platform of the target host program, allowing the host program platform to perform a resource deduction on the target card bound to the target host program to complete the payment. The network-wide payment platform can interact with e-commerce application programs in user terminals and SDKs integrated with different host programs. The network-wide payment platform can also interact with the host program backends corresponding to different applications, allowing the unified payment technical specifications between different card issuers and other institutions during the payment process, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

Figure 21:
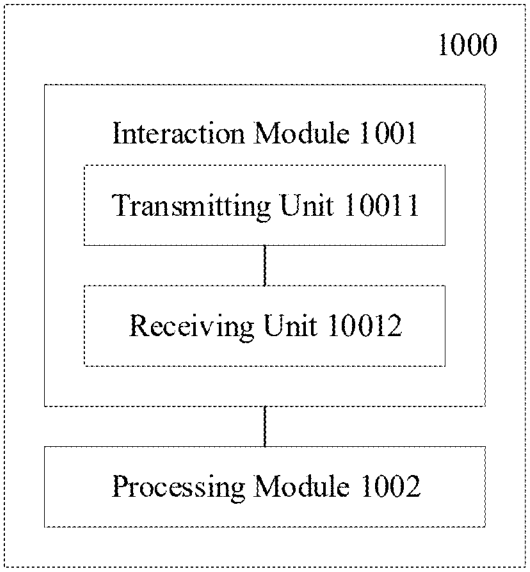
FIG. 21 is a schematic structural diagram of another embodiment of a payment management apparatus in accordance with the sixth aspect of the present disclosure.

In some embodiments, the payment management apparatus 1000 may further include a processing module. FIG. 21 is a schematic structural diagram of another embodiment of a payment management apparatus in accordance with the sixth aspect of the present disclosure. The difference between FIG. 21 and FIG. 20 is that the payment management apparatus 1000 shown in FIG. 21 may also include a processing module 1002.

The receiving unit 10012 may be configured to receive a first payment request message sent by the user terminal through an e-commerce application program, where the first payment request message includes a user identifier.

The processing module 1002 can be configured to: obtain the priority order of host programs supported by the network-wide payment platform based on the historical payment data corresponding to the user identifier and/or a pre-stored payment priority policy; and generate a first host program list based on host program identifiers of the top N host programs from high to low priority, where N is a positive integer.

The transmitting unit 10011 may be configured to send a first payment feedback message to the e-commerce application program of the user terminal, where the first payment feedback message includes the first host program list.

In some embodiments, a second host program list includes host program identifiers of host programs owned by the user terminal. A target host program is a host program, in the intersection of the first host program list and the second host program list, corresponding to a host program identifier specified by a user.

In some embodiments, the second host program list includes host program identifiers of host programs owned by the user terminal. The target host program is a host program with the highest priority corresponding to a host program identifier in the intersection of the first host program list and the second host program list.

In some embodiments, the receiving unit 10012 may be configured to receive a first payment message sent by the second SDK called by the user terminal when the user terminal calls the second SDK and determines that the target host program has a corresponding first identifier. The first identifier is used to indicate that a user account in a host program has the function of making payments using the network-wide payment platform.

The transmitting unit 10011 may be configured to send the first payment message to the host program platform. The first payment message instructs the host program platform to perform a resource deduction of the target card and complete the payment using the target card. The first payment message includes a host program identifier of the target host program and a first identifier corresponding to the target host program.

In some embodiments, the transmitting unit 10011 may be configured to send the first identifier to the target host program through the host program platform when the user terminal calls the second SDK to determine that the target host program does not have a corresponding first identifier.

The receiving unit 10012 may be configured to receive a second payment message sent by the second SDK called by the user terminal.

The transmitting unit 10011 may be configured to send the second payment message to the host program platform.

The second payment message instructs the host program platform to perform a resource deduction of the target card and complete the payment using the target card. The second payment message includes the host program identifier of the target host program and the first identifier corresponding to the target host program.

In some embodiments, the receiving unit 10012 may be configured to receive a second identifier request message sent by the host program platform when logging in to the target host program.

The second identifier request message includes the user identity information and host program identifier. The second identifier request message is generated according to the first identifier request message sent by the terminal device by calling the target host program. The first identifier request message includes the user identity information.

The processing module 1002 may be configured to assign a first identifier to the target host program based on the user identity information, the host program identifier and the pre-stored activated user identity information.

The transmitting unit 10011 may be configured to send a second identifier feedback message to the host program platform, so that the host program platform sends a first identifier feedback message to the target host program according to the second identifier feedback message.

The first identifier feedback message and the second identifier feedback message include the first identifier.

In some embodiments, the user identity information includes a first user unique identifier and a first phone number, and the activated user identity information includes a second user unique identifier and a second phone number.

The processing module 1002 may also be configured to bind a first user account and a second user account and generate the first identifier when the activated user identity information includes the unique identifier of the target second user.

The target second user unique identifier is a second user unique identifier that is consistent with the first user unique identifier. The first user account is a user account corresponding to the first user unique identifier in the target host program. The second user account is a user account corresponding to the target second user unique identifier and the target second phone number in the network-wide payment platform. The target second phone number is a second phone number that is consistent with the first phone number.

The processing module 1002 can also be configured to create a new third user account, bind the first user account and the third user account, and generate the first identifier when the activated user identity information does not include the target second user unique identifier.

The third user account is a user account corresponding to the first user unique identifier in the network-wide payment platform.

In some embodiments, the receiving unit 10012 may also be configured to receive a version determination message sent by the second SDK of the target host program called by the user terminal.

The processing module 1002 may also be configured to determine whether the version of the second SDK is an available version according to the version determination message.

The transmitting unit 10011 may also be configured to send a version feedback message to the second SDK of the target host program, where the version feedback message indicates whether the version of the second SDK is an available version.

In some embodiments, the receiving unit 10012 may also be configured to receive an SDK login determination message sent by the second SDK of the target host program called by the user terminal.

The processing module 1002 may also be configured to determine whether the second SDK is logged in based on the SDK login determination message.

The transmitting unit 10011 may also be configured to send an SDK login feedback message to the second SDK of the target host program, where the SDK login feedback message indicates whether the second SDK is logged in.

In some embodiments, the receiving unit 10012 may also be configured to receive a security determination message sent by the second SDK of the target host program called by the user terminal.

The processing module 1002 can also be configured to determine whether the user account in the target host program and resource transfer-in account for this payment are safe based on the security determination message.

The transmitting unit 10011 can also be configured to send a security feedback message to the second SDK of the target host program. The security feedback message indicates whether the user account in the target host program and the resource transfer-in account are safe.

In some embodiments, the receiving unit 10012 may also be configured to receive user identity information sent by the host program platform when a user applies for a resource card.

The processing module 1002 can also be configured to store user identity information as activated user identity information.

In some embodiments, the transmitting unit 10011 may also be configured to provide order information for the e-commerce application program in response to an order request from the e-commerce application program.

In some embodiments, the transmitting unit 10011 may also be configured to send a payment code to the second SDK in response to a payment code request from the second SDK called by the user terminal.

The receiving unit 10012 can also be configured to receive a payment request initiated by a payment acceptance terminal scanning a payment code, and interact with the host program platform to complete a payment indicated by the payment request.

In some embodiments, the receiving unit 10012 may also be configured to receive a payment request initiated by the second SDK called by the user terminal to scan a collection code.

The interaction module 1001 can be configured to interact with the host program platform to complete a payment indicated by the payment request.

Figure 22:
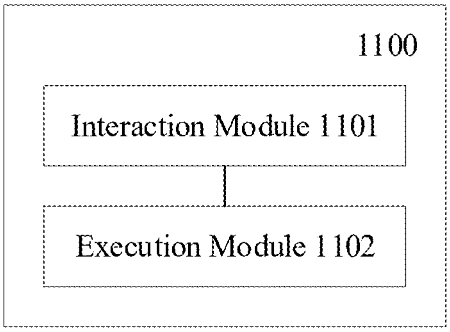
FIG. 22 is a schematic structural diagram of an embodiment of a backend service apparatus in accordance with the seventh aspect of the present disclosure.

A seventh aspect of the present disclosure provides a backend service apparatus, which is an apparatus in the host program platform in the above embodiments. FIG. 22 is a schematic structural diagram of an embodiment of a backend service apparatus in accordance with the seventh aspect of the present disclosure. As shown in FIG. 22, the backend service apparatus 1100 includes an interaction module 1101 and an execution module 1102.

The interaction module 1101 can be configured to interact with the network-wide payment platform to determine a target card for payment when the e-commerce application program of the user terminal triggers a payment.

The user terminal includes an e-commerce application program, a first SDK integrated with the e-commerce application program, a host program, and a second SDK integrated with the host program. The target card is a resource card bound to the target host program. The target card is determined based on the interaction between the second SDK of the target host program called by the user terminal and the network-wide payment platform. The target host program is a host program, in the first host program list, determined by the first SDK called by the user terminal. The first host program list includes host program identifiers of at least part of host programs supported by the network-wide payment platform.

In some embodiments, the first host program list includes host program identifiers of N host programs arranged from high to low priority, where N is an integer, and the priority is determined based on historical payment data corresponding to the user identifier provided by the user terminal through the e-commerce application program and/or a pre-stored payment priority policy.

The execution module 1102 may be configured to execute the resource deduction of the target card to complete the payment using the target card.

In the embodiments of the present disclosure, the user terminal includes an e-commerce application program, a first SDK integrated with the e-commerce application program, a host program, and a second SDK integrated with the host program. During the payment process, the network-wide payment platform can interact with the first SDK and provide the first SDK with a list including host program identifiers of at least part of host programs supported by the network-wide payment platform, so that the first SDK determines a target host program. Under such a circumstance, the user terminal can call up the target host program. The network-wide payment platform can interact with the second SDK integrated with the target host program itself, and can also interact with the host program platform of the target host program, allowing the host program platform to perform a resource deduction on the target card bound to the target host program to complete the payment. The network-wide payment platform can interact with e-commerce application programs in user terminals and SDKs integrated with different host programs. The network-wide payment platform can also interact with the host program backends corresponding to different applications, allowing the unified payment technical specifications between different card issuers and other institutions during the payment process, which realizes unified management of payments and reduces the difficulty of payment management.

The host program platforms corresponding to different host programs share the same network-wide payment platform. Different host programs share the same network-wide payment platform through their respective integrated SDKs. Payment management is no longer restricted by the host program of the card issuer or other institution to which the payment account belongs. The user payment experience is unified, and users do not need to use different operating methods for different host program payments, which improves a user's payment experience.

In some embodiments, a second host program list includes host program identifiers of host programs owned by the user terminal. The target host program is a host program, in the intersection of the first host program list and the second host program list, corresponding to the host program identifier specified by a user.

In some embodiments, the second host program list includes host program identifiers of host programs owned by the user terminal. The target host program is a host program with the highest priority corresponding to a host program identifier in the intersection of the first host program list and the second host program list.

In some embodiments, the interaction module 1101 can be configured to receive a first payment message sent through the network-wide payment platform by the second SDK called by the user terminal when the user terminal calls the second SDK and determines that the target host program has a corresponding first identifier.

The first payment message includes a host program identifier of the target host program and a first identifier corresponding to the target host program.

The execution module 1102 may be configured to determine the target card according to the first payment message.

In some embodiments, the interaction module 1101 may be configured to receive a second payment message sent through the network-wide payment platform by the second SDK called by the user terminal, when the user terminal calls the second SDK and determines that the target host program does not have a corresponding first identifier.

The second payment message includes the host program identifier of the target host program and the first identifier corresponding to the target host program assigned by the network-wide payment platform.

The execution module 1102 may be configured to determine the target card according to the second payment message.

In some embodiments, the interaction module 1101 may also be configured to receive a first identifier request message sent by the target host program called by the user terminal when logging in to the target host program.

The first identifier request message includes user identity information.

The interaction module 1101 may also be configured to respond to the first identifier request message and send a second identifier request message to the network-wide payment platform.

The second identifier request message is used to request the first identifier. The second identifier request message includes the user identity information and host program identifier.

The interaction module 1101 can also be configured to receive a second identifier feedback message sent by the network-wide payment platform.

The second identifier feedback message includes the first identifier. The first identifier is obtained by the network-wide payment platform based on the user identity information, host program identifier and pre-stored user identity information.

The interaction module 1101 may also be configured to send a first identifier feedback message to the target host program of the user terminal according to the second identifier feedback message.

The first identifier feedback message includes the first identifier.

In some embodiments, the interaction module 1101 can also be configured to send user identity information to the network-wide payment platform when a user applies for a resource card, so that the network-wide payment platform stores the user identity information as activated user identity information.

Figure 23:
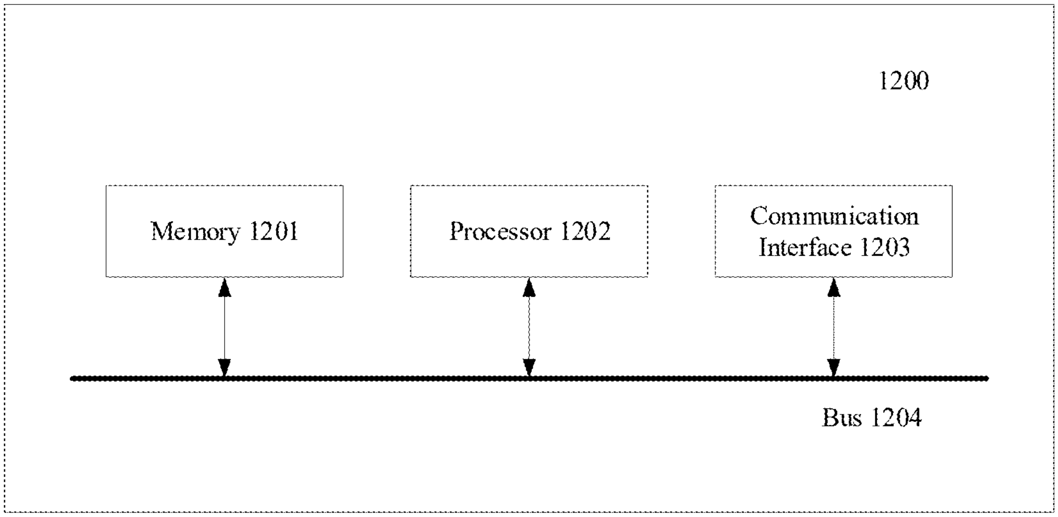
FIG. 23 is a schematic structural diagram of an embodiment of a user terminal in accordance with the eighth aspect of the present disclosure.

The eighth aspect of the present disclosure also provides a user terminal. FIG. 23 is a schematic structural diagram of an embodiment of a user terminal in accordance with the eighth aspect of the present disclosure. As shown in FIG. 23, the user terminal 1200 includes a memory 1201, a processor 1202, and a computer program stored on the memory 1201 and executable on the processor 1202.

In some embodiments, the processor 1202 may include a central processing unit (CPU), or an application specific integrated circuit (ASIC), or may be configured to implement one or more integrated circuits of embodiments of the present disclosure.

Memory 1201 may include read-only memory (ROM), random access memory (RAM), magnetic disk storage media devices, optical storage media devices, flash memory devices, electrical, optical or other physical/tangible memory storage device. Thus, generally, memory includes one or more tangible (non-transitory) computer-readable storage media (e.g., memory devices) encoded with software including computer-executable instructions. When the software is executed (e.g., by one or multiple processors), it is operable to perform the operations described with reference to the payment methods in the embodiments according to the second aspect of the present disclosure.

The processor 1202 reads the executable program code stored in the memory 1201 to run the computer program corresponding to the executable program code, so as to implement the payment method in the embodiments according to the second aspect of the present disclosure.

In some embodiments, user terminal 1200 may also include communication interface 1203 and bus 1204. Here, as shown in FIG. 23, the memory 1201, the processor 1202, and the communication interface 1203 are connected through the bus 1204 and complete communication with each other.

The communication interface 1203 is mainly configured to implement communication between modules, apparatuses, units and/or devices in the embodiments of the present disclosure. Input devices and/or output devices may also be accessed through the communication interface 1203.

Bus 1204 includes hardware, software, or both, coupling the components of user terminal 1200 to each other. By way of example, but not limitation, the bus 1204 may include an accelerated graphics port (AGP) or other graphics bus, an enhanced industry standard architecture (EISA) bus, a front side bus (FSB), hyper transport (HT) interconnect, industry standard architecture (ISA) bus, infinite bandwidth interconnect, low pin count (LPC) bus, memory bus, micro channel architecture (MCA) bus, peripheral component interconnect (PCI) bus, PCI-express (PCI-E) bus, serial advanced technology attachment (SATA) bus, video electronics standards association local bus (VLB) or other suitable bus or a combination of two or more of these. Where appropriate, bus 1204 may include one or more buses. Although the embodiments of the present disclosure describe and illustrate a specific bus, the present disclosure contemplates any suitable bus or interconnection.

A ninth aspect of the present disclosure provides a payment management device. The payment management device is a device in the network-wide payment platform in the above embodiments. The payment management device may include a memory, a processor, and a computer program stored on the memory and executable on the processor. In some embodiments, the payment management device may also include a communication interface and bus. The memory, processor, and communication interface can be connected through the bus and communicate with each other.

For the connection relationship and example description of the memory, processor, communication interface and bus, refer to the relevant description in the above user terminal embodiment, which will not be repeated here. The difference between the payment management device and the user terminal embodiments is that the processor runs the computer program corresponding to the executable program code by reading the executable program code stored in the memory, so as to implement the above payment methods in accordance with the third aspect of the present disclosure. Specifically, memory includes one or more tangible (non-transitory) computer-readable storage media (e.g., memory devices) encoded with software including computer-executable instructions, and when the software is executed (e.g., by one or more processors), it is operable to perform the operations described with reference to the payment methods in the embodiments according to the third aspect of the present disclosure.

A tenth aspect of the present disclosure provides a backend service device. The backend server device is a device in the host program platform in the above embodiments. The backend service device may include a memory, a processor, and a computer program stored on the memory and executable on the processor. In some embodiments, a payment management device may also include a communication interface and bus. The memory, processor, and communication interface can be connected through the bus and communicate with each other.

For the connection relationship and example description of the memory, processor, communication interface and bus, refer to the relevant description in the above user terminal embodiments, which will not be repeated here. The difference between the payment management device and the user terminal embodiments is that the processor runs the computer program corresponding to the executable program code by reading the executable program code stored in the memory, so as to implement the above payment methods in accordance with the fourth aspect of the present disclosure. Specifically, memory includes one or more tangible (non-transitory) computer-readable storage media (e.g., memory devices) encoded with software including computer-executable instructions, and when the software is executed (e.g., by one or more processors), it is operable to perform the operations described with reference to the payment methods in the embodiments according to the fourth aspect of the present disclosure.

An eleventh aspect of the present disclosure provides a payment system, which may include the user terminal, payment management device and backend service device in the above embodiments. For the specific content of the user terminal, refer to the relevant descriptions in the above embodiments. For the specific content of the payment management device, refer to the relevant descriptions of the network-wide payment platform, payment management apparatus and payment management device in the above embodiments. For the specific content of the backend service device, refer to the relevant content of the host program platform, backend service apparatus and backend service device in the above embodiments, which will not be repeated here.

A twelfth aspect of the present disclosure provides a computer-readable storage medium. Computer program instructions are stored on the computer-readable storage medium. When executed by a processor, the computer program instructions can implement the payment methods in the embodiments of the present disclosure, and can achieve the same technical effect. To avoid repetition, details of which will not repeat here. The computer-readable storage media may include non-transitory computer-readable storage media, such as ROM, RAM, magnetic disks or optical disks, etc., which are not limited here.

The present disclosure can also provide a computer program product. When the instructions in the computer program product are executed by the processor of the electronic device, the processor causes the electronic device to execute the payment methods in the embodiments of the present disclosure. For the specific content of the payment method, refer to the above embodiments. The relevant instructions will not be repeated here. The electronic device may include the user terminal, payment management device, and backend service device in the above embodiments.

It should be noted that each embodiment in this specification is described in a progressive manner, where the same or similar parts between the various embodiments can be referred to each other. Each embodiment focuses on its differences from other embodiments. For apparatus embodiments, user terminal embodiments, device embodiments, system embodiments and computer-readable storage medium embodiments, relevant information may be found in the description of the method embodiments. This application is not limited to the specific steps and structures described above and illustrated in the drawings. Those skilled in the art can make various changes, modifications and additions, or change the order between steps after understanding the spirit of the present disclosure. Also, for the sake of brevity, detailed descriptions of known method techniques are omitted here.

Aspects of the present disclosure are described with reference to flow chart illustrations and/or block diagrams of methods, apparatus (systems) and computer program products according to embodiments of the disclosure. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine such that execution of the instructions via the processor of the computer or other programmable data processing apparatus enables implementation of the functions/actions specified in one or more blocks of a flow chart and/or block diagram. Such a processor may be, but is not limited to, a general-purpose processor, a special-purpose processor, a special application processor, or a field-programmable logic circuit. It will also be understood that each block in the block diagrams and/or flow chart illustrations, and combinations of blocks in the block diagrams and/or flow chart illustrations, can also be implemented by special purpose hardware that performs the specified functions or actions, or can be implemented by special purpose hardware and a combination of computer instructions.

Those skilled in the art should understand that the above embodiments are illustrative rather than restrictive. Different technical features appearing in different embodiments can be combined to achieve beneficial effects. Those skilled in the art should be able to understand and implement other modified embodiments of the disclosed embodiments based on understanding the drawings, description and claims. In the claims, the term "comprising" does not exclude other apparatuses or steps, the term "a" does not exclude a plurality, and the terms "first" and "second" are used to indicate names rather than to indicate any specific order. Any reference signs in the claims shall not be construed as limiting the scope. The functions of several parts appearing in the claims may be implemented by a single hardware or software module. The appearance of certain technical features in different dependent claims does not mean that these technical features cannot be combined to achieve beneficial effects.

What is claimed is:

1. A payment method, applied to a user terminal, the user terminal including an e-commerce application program of a merchant, a first SDK integrated with the e-commerce application program, a plurality of different host programs, and each host program being integrated with a second SDK, the method comprising:

in response to that the e-commerce application program triggers a payment, calling, by the e-commerce application program on the user terminal, the first SDK to obtain a first host program list from a network-wide payment platform of a card organization, wherein the first host program list includes host program identifiers of at least part of host programs supported by the network-wide payment platform, wherein the host programs being front-end service application programs of different card issuers; the first SDK and the second SDK are provided by the card organization to the user terminal, and are configured to facilitate communication and interaction between the user terminal and the network-wide payment platform of the card organization;

determining, by the first SDK, a target host program from the first host program list, and calling up the target host program, the first host program list comprising the plurality of host programs, wherein the plurality of host programs are integrated with unified second SDKs to provide unified payment technical specifications and unified payment identifiers among the different card issuers, each host program corresponds to one of a plurality of host program backend platforms of the card issuers, the host program backend platforms are configured to interface with the same network-wide payment platform of the card organization to authorize resource card binding and resource deduction channels and provide the user terminal with payment access through the corresponding host programs; and calling the second SDK by the target host program to interact with the network-wide payment platform, so that the network-wide payment platform interacts with a target host program platform in the plurality of host program backend platforms to complete the payment using a target card, comprising:

calling the second SDK of the target host program to send a message to the network-wide payment platform, wherein the message comprises at least one of a version determination massage, an SDK login determination message, or a security determination message;

receiving a feedback message sent by the network-wide payment platform through the second SDK of the target host program, the feedback message indicating at least one of: whether a version of the second SDK is an available version in response to the version determination massage, whether the second SDK is logged in in response to the SDK login determination message, or whether a user account in the target host program and a resource transfer-in account are safe in response to the security determination message;

calling, by the target host program on the user terminal, the second SDK to query whether the target host program has a corresponding first identifier, wherein the first identifier indicates that a user account in a host program has a function of making payments using the network-wide payment platform; and in response to that the target host program has a corresponding first identifier, calling, by the target host program, the second SDK to send a first payment message to the network-wide payment platform, so that the network-wide payment platform sends the first payment message to the target host program platform, and the target host program platform performs a resource deduction of the target card to complete the payment using the target card, wherein the first payment message includes a host program identifier of the target host program and the first identifier corresponding to the target host program, wherein the target card is a resource card bound to the target host program.

2. The method according to claim 1, wherein calling the first SDK to obtain the first host program list from the network-wide payment platform comprises:

sending a first payment request message to the network-wide payment platform through the e-commerce application program, wherein the first payment request message includes a user identifier and is used to instruct the network-wide payment platform to generate the first host program list based on historical payment data corresponding to the user identifier and/or a pre-stored payment priority strategy, and the first host program list includes host program identifiers of N host programs arranged from high to low priority, wherein N is a positive integer; and receiving a first payment feedback message sent by the network-wide payment platform, wherein the first payment feedback message includes the first host program list.

3. The method according to claim 1, wherein, before calling up the target host program, the method further comprises:

calling the first SDK to obtain a second host program list locally, wherein the second host program list includes host program identifiers of host programs owned by the user terminal; and calling the first SDK to obtain an intersection of the first host program list and the second host program list and display the intersection, and in response to a first user input, determining, from the intersection, a host program corresponding to a host program identifier indicated in the first user input to be the target host program; or calling the first SDK to obtain an intersection of the first host program list and the second host program list, and determining a host program with a highest priority corresponding to a host program identifier in the intersection as the target host program.

4. The method according to claim 1, wherein calling the second SDK by the target host program to interact with the network-wide payment platform, so that the network-wide payment platform interacts with the host program platform to complete the payment using a target card further comprises:

when the target host program does not have a corresponding first identifier, calling the target host program to request a first identifier corresponding to the target host program from the network-wide payment platform through the host program platform;

calling the target host program to receive the first identifier corresponding to the target host program assigned by the network-wide payment platform through the host program platform; and calling the second SDK to send a second payment message to the network-wide payment platform, so that the network-wide payment platform sends the second payment message to the host program platform, and the host program platform performs a resource reduction of the target card to complete the payment using the target card, wherein the second payment message includes the host program identifier of the target host program and the first identifier corresponding to the target host program.

5. The method according to claim 4, wherein calling the target host program to request the first identifier corresponding to the target host program from the network-wide payment platform through the host program platform comprises:

when logging in to the target host program, calling the target host program to send a first identifier request message to the host program platform, wherein the first identifier request message includes user identity information and is used to instruct the host program platform to send a second identifier request message to the network-wide payment platform, wherein the second identifier request message is used to request the first identifier, and the second identifier request message includes the user identity information and the host program identifier; and calling the target host program to receive a first identifier feedback message sent by the host program platform, wherein the first identifier feedback message includes the first identifier, and the first identifier feedback message is generated based on a second identifier feedback message sent to the host program platform by the network-wide payment platform, wherein the second identifier feedback message includes the first identifier, and the first identifier is generated by the network-wide payment platform according to the user identity information, the host program identifier and pre-stored activated user identity information.

6. The method according to claim 5, wherein the activated user identity information includes user identity information sent by the host program platform to the network-wide payment platform when the user applies for a resource card.

7. The method according to claim 1, wherein, before calling the first SDK to obtain the first host program list from the network-wide payment platform, the method further comprises:

in response to a second user input, obtaining order information from the network-wide payment platform through the e-commerce application program; and in response to a third user input to an order page, triggering the payment, wherein the order page includes the order information.

8. The method according to claim 1, further comprising:

calling the second SDK to obtain a payment code from the network-wide payment platform, wherein the payment code is used for scanning by a payment acceptance terminal to initiate a payment request to the network-wide payment platform; or calling the second SDK to scan a collection code and initiate a payment request to the network-wide payment platform.

* * * * *